United States Patent
Ferguson et al.

(10) Patent No.: US 9,765,750 B2
(45) Date of Patent: Sep. 19, 2017

(54) MULTI-SPARK AND CONTINUOUS SPARK IGNITION MODULE, SYSTEM, AND METHOD

(71) Applicant: Advanced Fuel and Ignition Systems, Inc., Hebron, IN (US)

(72) Inventors: Tod Ferguson, Oklahoma City, OK (US); Ed Browalski, West Bloomfield, MI (US); Ron Paul, Waterford, MI (US)

(73) Assignee: ADVANCED FUEL AND IGNITION SYSTEM INC., Hebron, IN (US)

( * ) Notice: Subject to any disclaimer, the term of this patent is extended or adjusted under 35 U.S.C. 154(b) by 98 days.

(21) Appl. No.: 14/647,617

(22) PCT Filed: Nov. 26, 2013

(86) PCT No.: PCT/US2013/072051
§ 371 (c)(1),
(2) Date: May 27, 2015

(87) PCT Pub. No.: WO2014/085481
PCT Pub. Date: Jun. 5, 2014

(65) Prior Publication Data
US 2015/0300312 A1 Oct. 22, 2015

Related U.S. Application Data

(60) Provisional application No. 61/731,179, filed on Nov. 29, 2012.

(51) Int. Cl.
*F02P 5/15* (2006.01)
*F02P 15/08* (2006.01)
*F02P 15/10* (2006.01)

(52) U.S. Cl.
CPC .............. *F02P 5/15* (2013.01); *F02P 15/08* (2013.01); *F02P 15/10* (2013.01); *Y02T 10/46* (2013.01)

(58) Field of Classification Search
CPC ... F02P 5/15; F02P 15/08; F02P 15/10; Y02T 10/46
(Continued)

(56) References Cited

U.S. PATENT DOCUMENTS 3,529,587 A * 9/1970 Sasayama ............. F02P 3/0884
123/598
3,747,582 A * 7/1973 Kato ..................... F02P 3/0884
123/149 D
(Continued)

OTHER PUBLICATIONS

International Search Report and Written Opinion in PCT/US2013/072051, dated Jun. 17, 2014, Tod Ferguson.

*Primary Examiner* — Mahmoud Gimie
(74) *Attorney, Agent, or Firm* — McAfee & Taft

(57) ABSTRACT

An ignition module, ignition system, and method for providing and generating at least two sparks in each cylinder in a single combustion cycle for RPMs over 3,000. The ignition module, system, and method is configured to detect misfires in a spark plug and take measures to alert a user of such misfires and cause an additional spark to occur prior to the completion of the cylinder's power stroke during its combustion cycle. The ignition module, system and method provides for continuous spark at high RPMs and is configured to reduce and/or eliminate engine misfire in excess of about 3,000 RPM for four stroke engines and up to 30,000 RPM for two stroke engines.

42 Claims, 13 Drawing Sheets

(58) Field of Classification Search
USPC .................................. 123/406.12, 636, 644
See application file for complete search history.

(56) References Cited

U.S. PATENT DOCUMENTS

| | | |
|---|---|---|
| 3,926,165 A | 12/1975 | Merrick |
| 4,029,998 A | 6/1977 | Anderson |
| 4,033,316 A | 7/1977 | Birchenough |
| 4,903,675 A | 2/1990 | Huntzinger et al. |
| 5,492,007 A | 2/1996 | Noble et al. |
| 6,058,908 A | 5/2000 | Masters |
| 6,196,208 B1 | 3/2001 | Masters |
| 6,820,602 B1 | 11/2004 | Masters |
| 7,100,589 B2 | 9/2006 | Toriyama |
| 7,121,270 B1 | 10/2006 | Plotnikov |
| 7,381,009 B2 | 6/2008 | Jenkins et al. |
| 8,430,084 B2 | 4/2013 | Puettmann |
| 2010/0324805 A1 | 12/2010 | Geyer |
| 2011/0309749 A1 | 12/2011 | Suckewer et al. |

\* cited by examiner

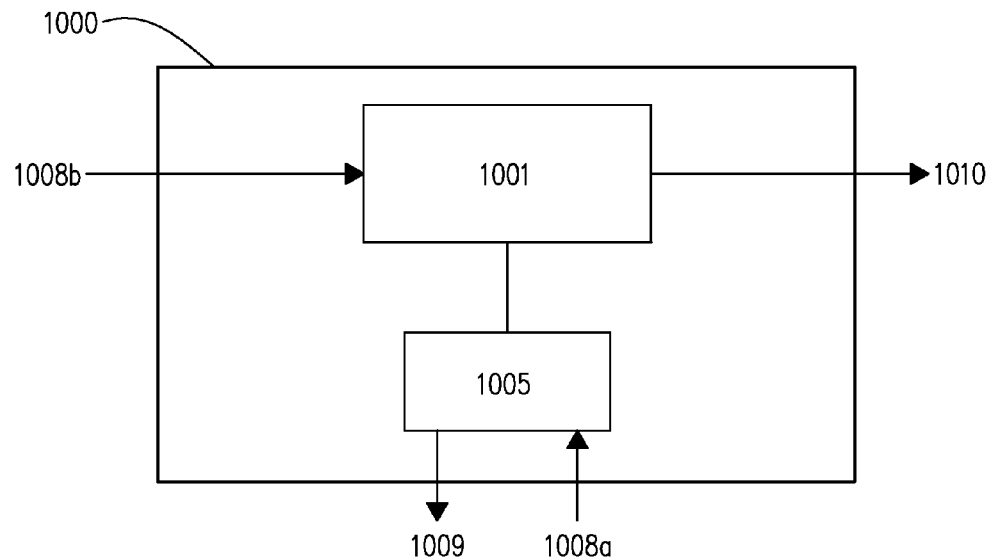
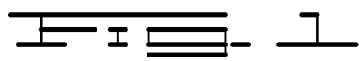
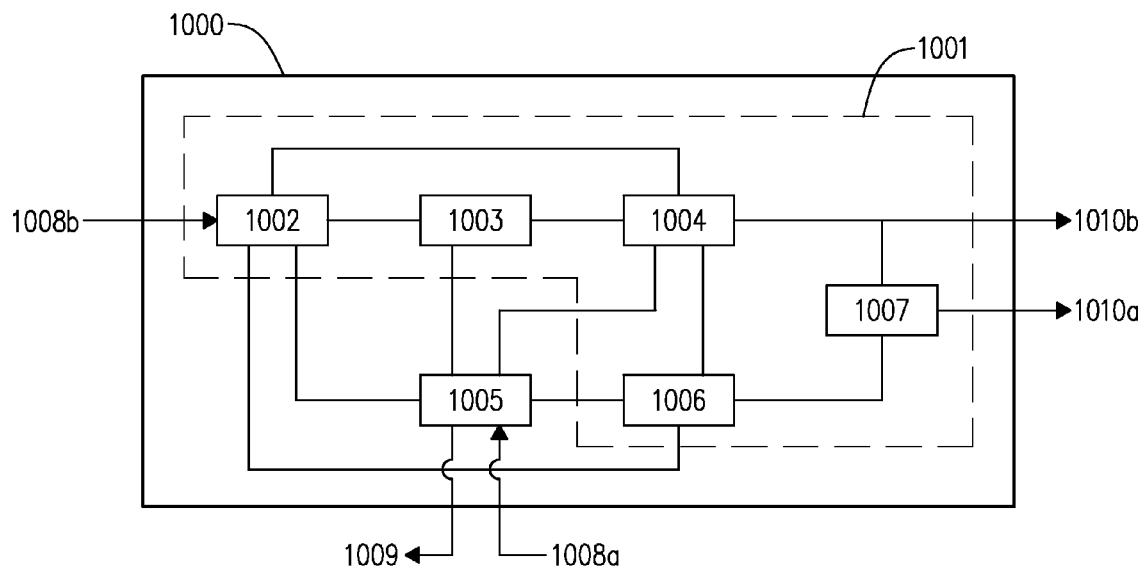

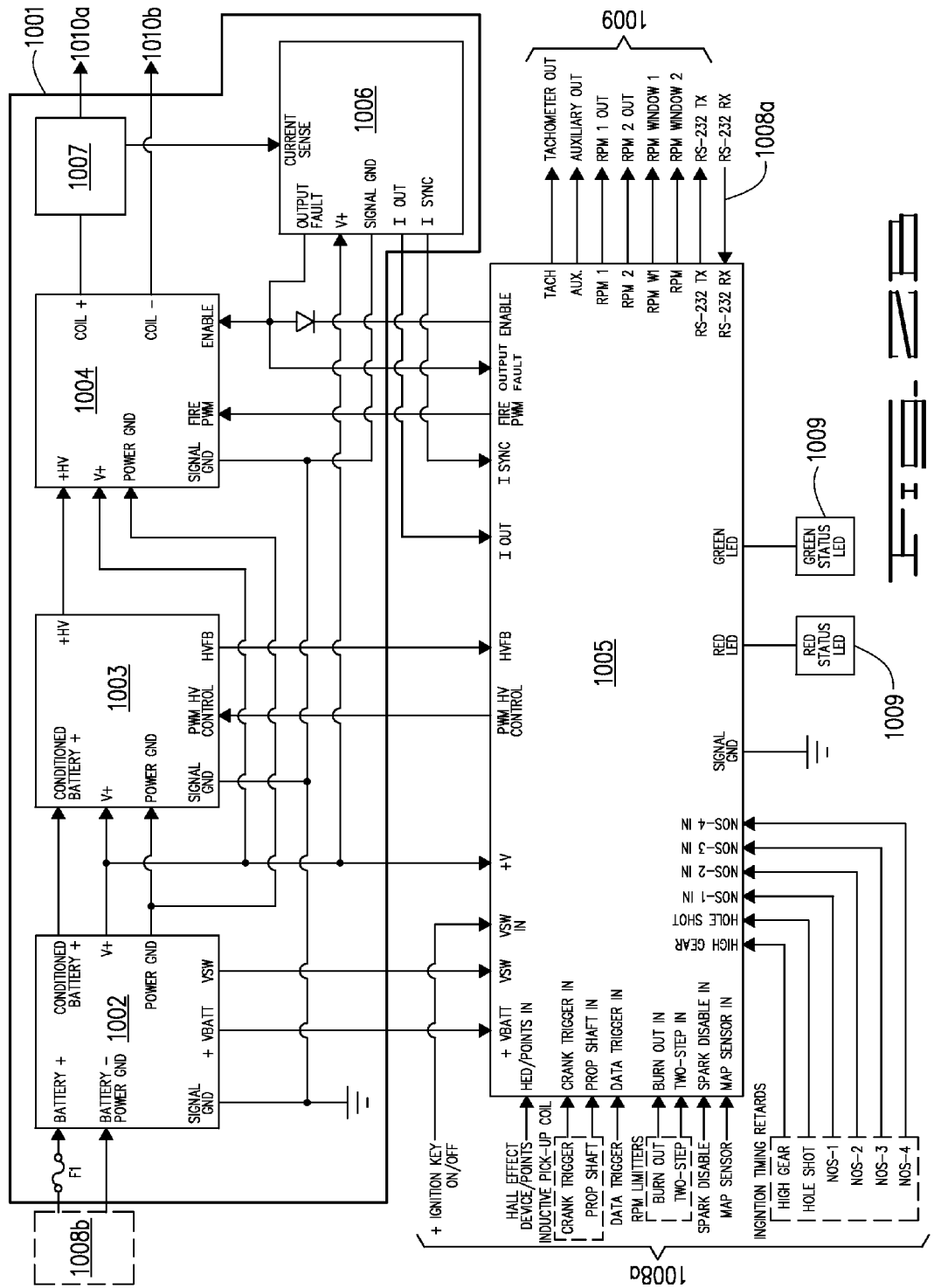

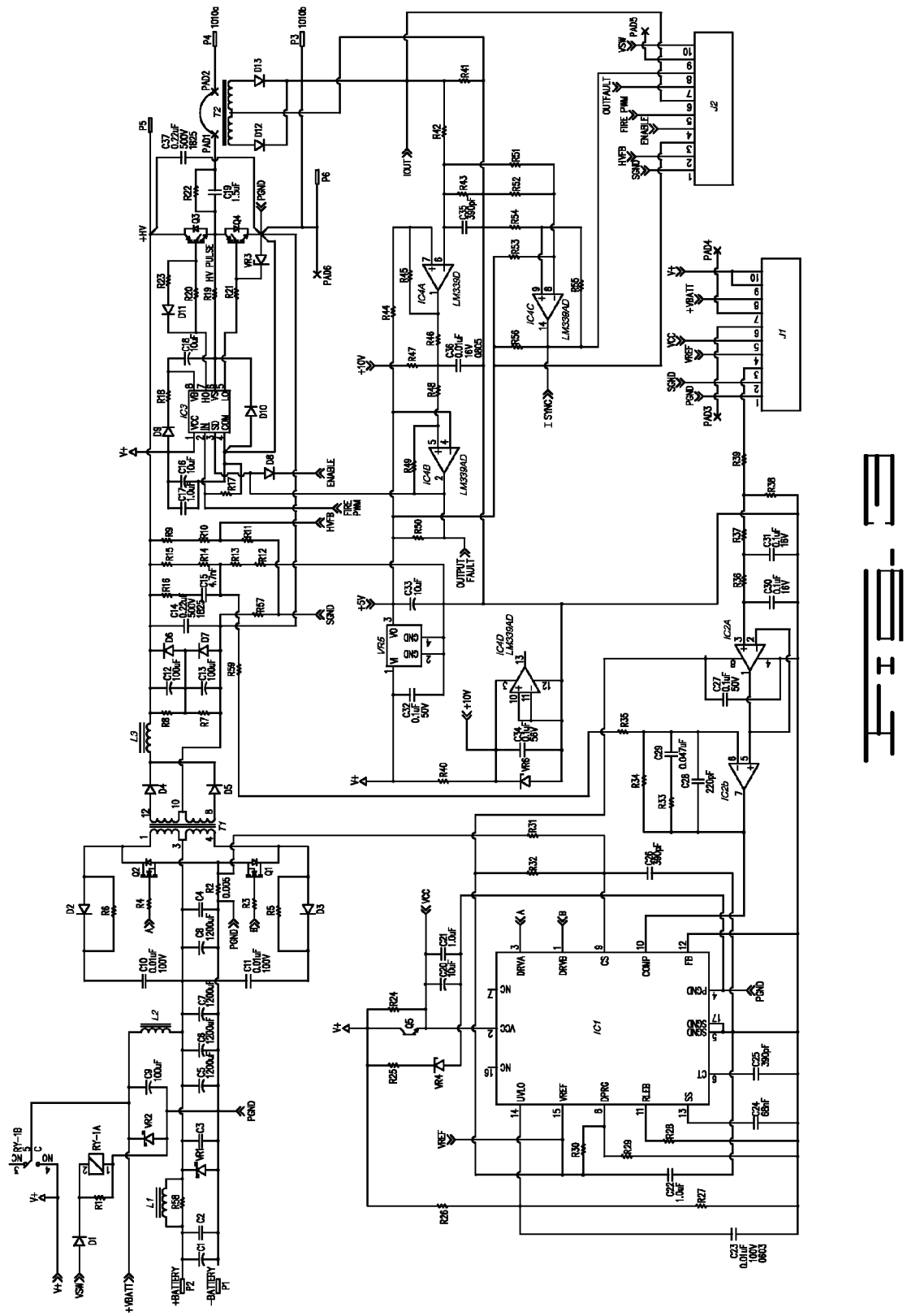

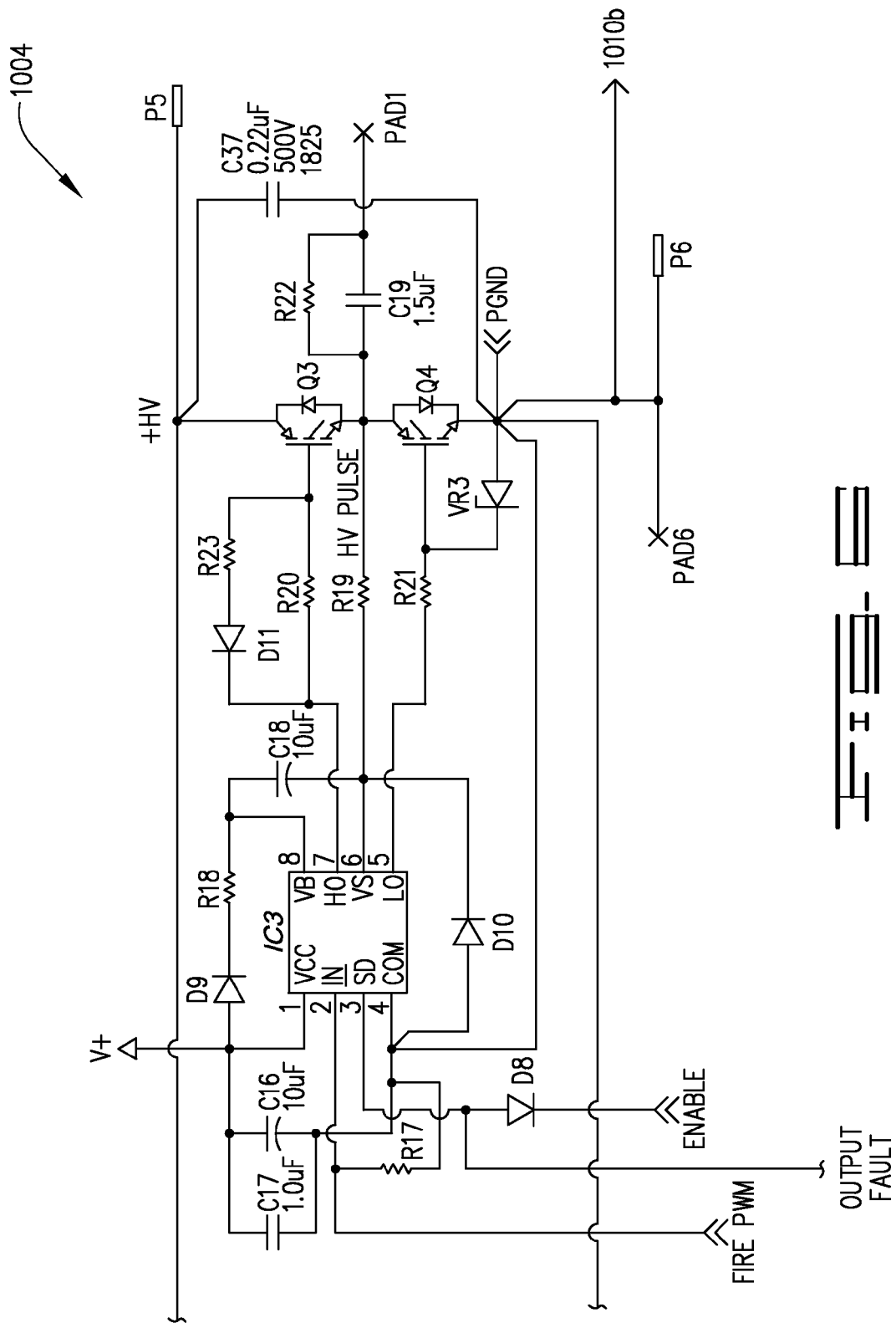

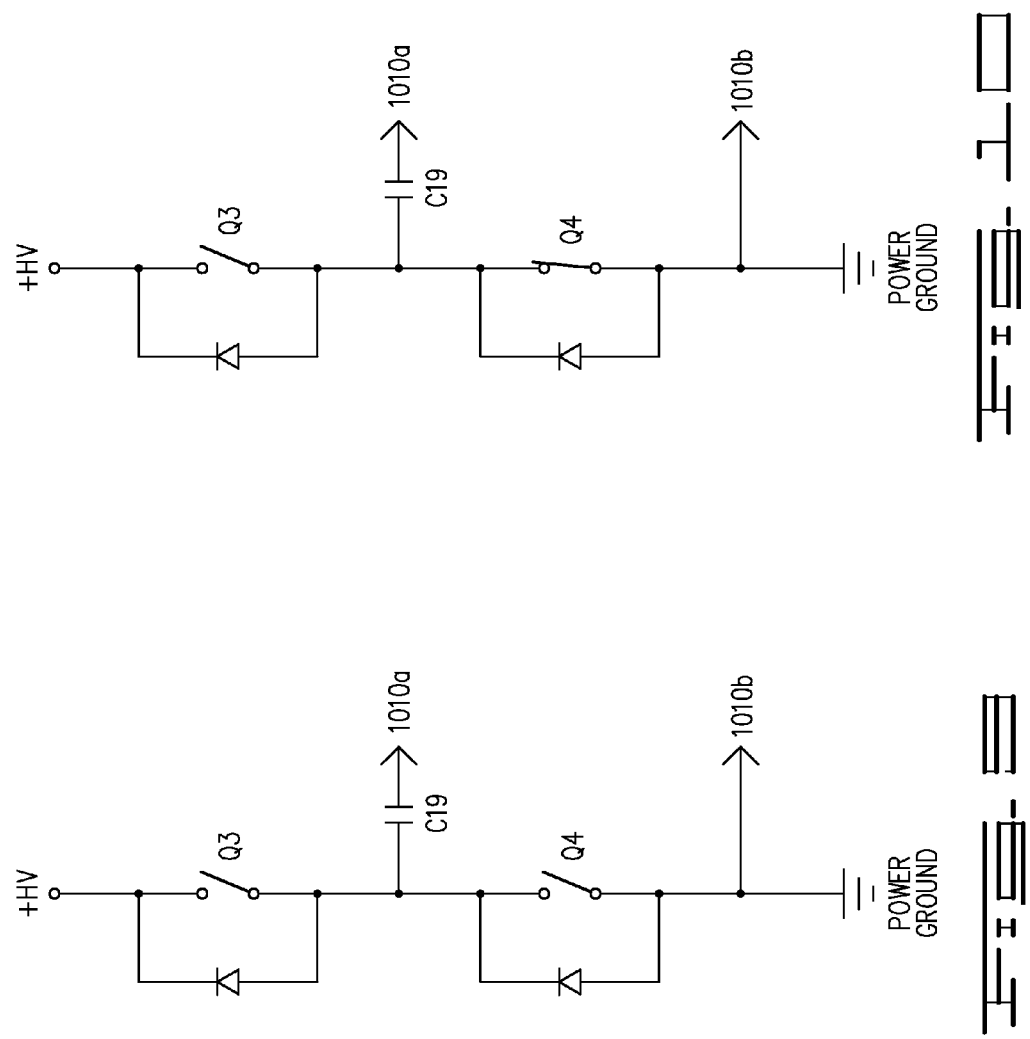

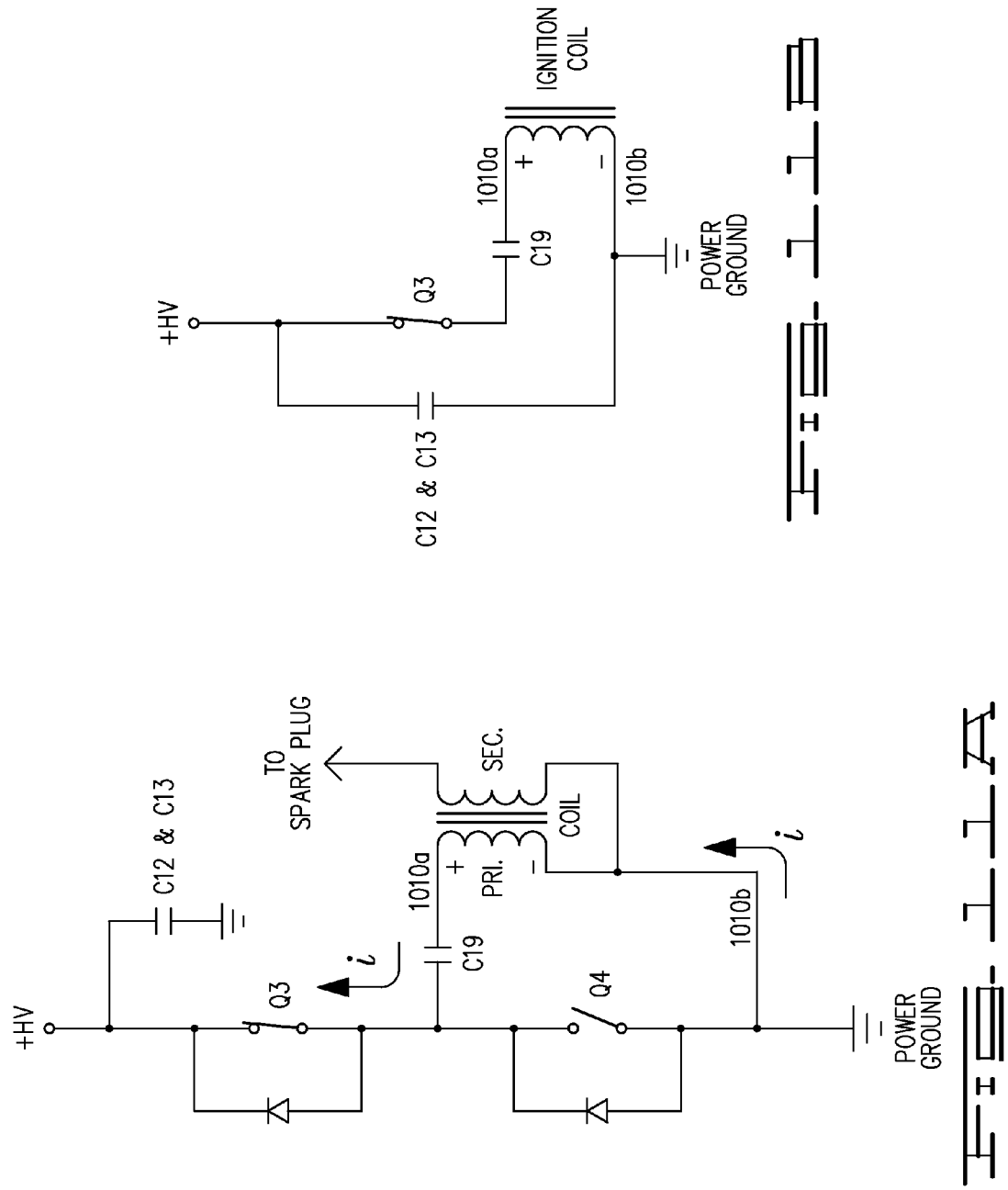

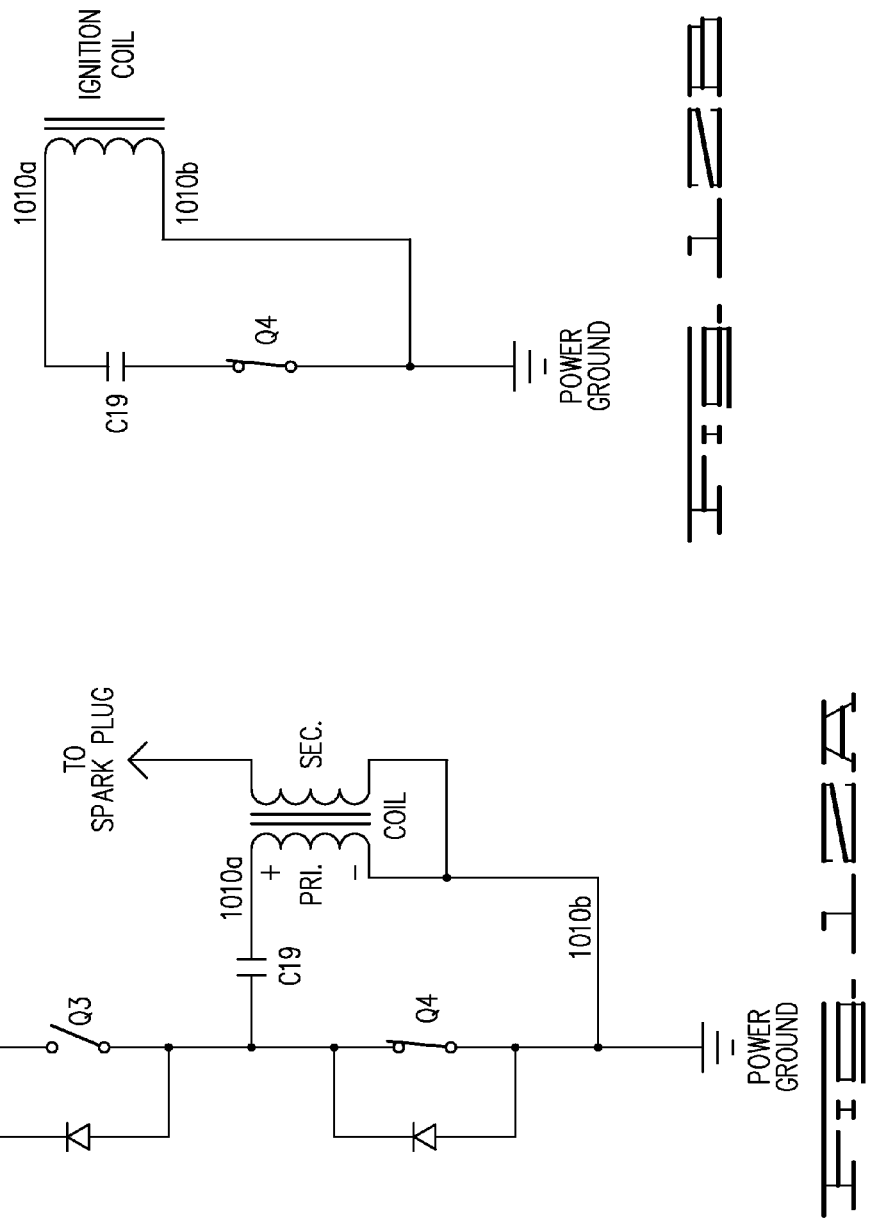

MULTI-SPARK AND CONTINUOUS SPARK IGNITION MODULE, SYSTEM, AND METHOD

CROSS-REFERENCE TO RELATED APPLICATIONS

This application claims the benefit of International Application No. PCT/US2013/072051 filed Nov. 26, 2013, which claims the benefit of U.S. Provisional Application No. 61/731,179, entitled "High RPM Continuous Spark Racing Ignition System" filed Nov. 29, 2012, the entirety of which are incorporated herein by reference.

BACKGROUND

Several factors influence spark timing for an internal combustion engine, such factors include, but are not limited to, engine compression ratios, engine speed, combustion chamber design, octane rating of fuel, air temperature, humidity, barometric pressure, turbulence in the intake manifold, fuel vaporization, and engine load. To prevent misfires within the engine, a spark lasting long enough with sufficient energy to ignite the compressed air/fuel mixture is needed to ensure proper firing of the engines. Engine speed, particularly in racing or other high-performance vehicles, has increased tremendously over the last ten (10) years. As a result of increasing engine speeds and compression ratios, the timing for initiating combustion must be adjusted and efforts must be taken to prevent the extinguishment of the spark in order to prevent misfires and/or incomplete combustion at high revolutions per minute (RPM). As a result of the increased engine speeds, engine compression ratios and engine misfires at high RPMs have increased, thus causing insufficient combustion of the air/fuel mixture resulting in decreased power and emissions.

Currently, ignition systems, particularly, engine systems that are configured or adapted for racing or high performance applications have only one high energy spark for all RPM ranges, or multiple sparks below 3,000 RPM without misfire. Some solutions have been to use a capacitive discharge ignition (CDI); however, these solutions can be ineffective at higher RPMs. The turbulence within the engine at high RPMs can extinguish the spark, thus resulting in incomplete combustion of the air/fuel mixture, and thereby result in reduced power. Additionally, misfires or incomplete combustion of the air/fuel mixture, may occur as a result of charge stratification, where the air/fuel mixture is not a homogenous ratio, or lean air/fuel mixtures.

Also, current ignition systems using older technology do not provide for the adjustment of the ignition coil voltage for varying RPMs and result in a shortened useful life of the ignition coil, distributor cap, spark plug wires, and spark plugs. Therefore a need exists for the active adjustment of the energy provided to the ignition coil for varying RPMs or engine loads.

A need exists for an ignition module and ignition system capable of preventing and/or mitigating against misfires as a result of charge stratification or lean air/fuel mixtures within the combustion chamber of a cylinder. A need exists for an ignition module, and ignition system capable of multi-spark and/or continuous spark at high RPM to reduce and/or eliminate engine misfire in excess of about 3,000 RPM for four stroke engines and up to 30,000 RPM for a two stroke engine.

SUMMARY

In order to preserve the life of the ignition coil, spark plug wires, and spark plugs, the apparatus, system and method described herein provide for the active adjustment of the voltage provided to an ignition coil for varying RPMs and/or sensed load on the engine. For example, by lowering the voltage provided to an ignition coil for lower RPMs and/or engine loads and raising the voltage provided to an ignition coil for higher RPMs and/or engine loads, the stress on the ignition components (e.g. ignition coil, distributor cap, spark plug wires, and spark plugs) during non-performance driving is lowered yet provides necessary energy at higher RPMs for complete combustion. In addition, the apparatus, system and method described herein also provide for multiple and/or continuous spark events for each combustion cycle of a cylinder for varying ranges of RPMs.

An ignition module for energizing an ignition coil and causing a generation of one or more sparks in a spark plug during a single combustion cycle of a cylinder in an internal combustion engine is described herein. The spark plug is operably connected to said ignition coil. The ignition module comprises a control circuit and a power circuit electrically coupled to the control circuit. The control circuit is configured to receive one or more inputs from external devices or from the power circuit. The one or more inputs indicate one or more engine operating parameters. The control circuit is also configured to provide one or more control signals to the power circuit, responsive in part, to the one or more received inputs from the external devices or the power circuit. The power circuit is configured to draw DC electrical energy from an external power source having a first energy level and output AC electrical energy having a second energy level, based in part on one or more control signals received from the control circuit. The second energy level is greater than the first energy level. The power circuit communicates the AC electrical energy to a primary side of the ignition coil, and the ignition coil supplies a voltage to the spark plug to generate one or more sparks.

An internal combustion ignition system configured to provide one or more sparks per combustion cycle in a cylinder is also provided. The system comprises an ignition module coupled to a power supply providing power having a first voltage level. The ignition module receives and transforms the power having the first voltage level into a second voltage level. The second voltage level is greater than the first voltage level. The ignition module is configured to modulate the power having the first voltage level. The ignition module is also configured to control timing, spark duration, and discharge of one or more sparks induced by an ignition coil during a combustion cycle of each cylinder in an internal combustion engine, responsive in part to one or more inputs, received by the ignition module, from one or more sensors. The inputs of the one or more sensors provide an indication of operating parameters of the ignition system.

The ignition system also includes a spark plug for generating a spark in a combustion chamber of the internal combustion engine during the combustion cycle of each cylinder. The ignition coil has a primary winding and a secondary winding. The spark plug is electrically coupled to the secondary winding of the ignition coil. The ignition coil is electrically coupled to the ignition module through the primary winding. The ignition coil receives power with the second voltage level from the ignition module. The ignition coil is configured to transform the power with the second voltage level into a power having a third voltage level. The third voltage level is higher or greater than the second voltage level. The ignition coil is configured to transmit the power having the third voltage level to the spark plug and provide discharge of the spark during the combustion cycle of each cylinder.

A method of ignition spark generation and management of a cylinder in an internal combustion engine during a combustion cycle is also disclosed. The method comprises providing, from an ignition module, electrical energy having a first energy level to a primary winding of an ignition coil. The method also includes transforming the electrical energy from a first energy level to a second energy level through a secondary winding of the ignition coil, where the second energy level is higher than the first energy level. The method includes transmitting the electrical energy having the second energy level to a spark plug electrically coupled to the secondary winding of the ignition coil and generating a spark across said spark plug. The method further includes detecting, by the ignition module, a misfire of the spark plug. Upon detection of the misfire, the ignition module causes the ignition coil to generate an additional spark across the spark plug prior to the end of the combustion cycle for that cylinder.

BRIEF DESCRIPTION OF THE DRAWINGS

FIG. 1 depicts a block diagram of an ignition module.

FIG. 2A depicts a detailed block diagram of an ignition module.

FIG. 2B depicts another detailed block diagram of a demonstrative embodiment of the ignition module.

FIG. 3 is a schematic illustration of a power circuit of the ignition module.

FIG. 5 depicts a schematic illustration of an embodiment of a step-up voltage circuit in the power circuit.

FIG. 6 depicts a schematic illustration of an embodiment of a switching circuit in the power circuit.

FIG. 9 depicts a simplified state diagram of the switching circuit when the ignition module is in its initial state after the module is powered on and the Enable and Fire PWM signals are low.

FIG. 10 depicts a simplified state diagram of the switching circuit when the Enable signal set to high and Fire PWM signal is low.

FIGS. 11A and 11B depict a state diagram of the first spark generation oscillation period and its equivalent circuit, respectively.

FIGS. 12A and 12B depict a state diagram of the second spark generation damped oscillation period and its equivalent circuit, respectively.

DETAILED DESCRIPTION

Figure 4A:
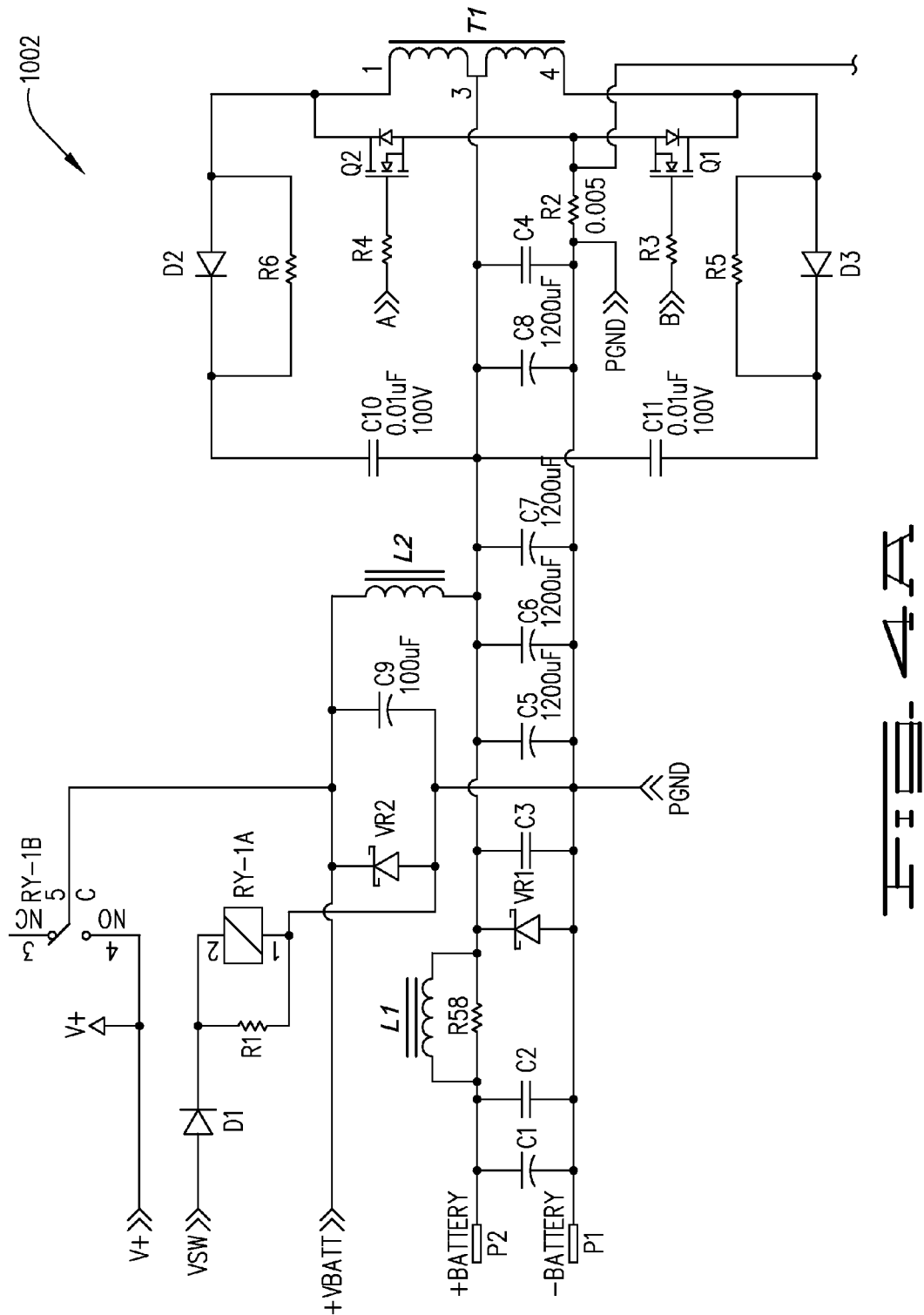
FIGS. 4A and 4B depicts a schematic illustration of different embodiments of a conditioner circuit in the power circuit.

It should also be appreciated that circuitry configurations that achieve the same results and functionality described herein are also suitable and do not depart from the spirit and scope of the present disclosure.

The description of the operating parameters of the control circuit of the described ignition module are demonstrative for an eight (8) cylinder internal combustion engine. Other inputs, not depicted, may also be included. Additionally, the inputs depicted in the figures may be omitted for a different engine size. As used herein, "engine size" refers to the number of cylinders in the engine. The ignition module described herein is suitable for use in varying engine sizes, for example four, six, eight, ten, twelve, and sixteen cylinder engines. It should be appreciated that the timing for the initiation of a firing sequence or spark cycle during the power stroke of a combustion cycle is adjusted in the control logic of the control circuit of the described ignition module. For example, in an 8 cylinder engine, the described ignition module is configured to maintain spark events throughout 22.5 degrees of crankshaft rotation during the power stroke. It should be appreciated that the crank angle degree window for different sized engines (i.e. number of cylinders) or 2-stroke or 4-stroke engines will vary and those windows are known in the art.

FIG. 1 depicts a general block diagram of ignition module 1000. Ignition module 1000 is a plug-and-play module such that it can be installed in a vehicle's engine and work in cooperation with existing and/or aftermarket components to provide for control, management, and discharge of a plurality of sparks via a spark plug in a cylinder during a single combustion cycle. Ignition module 1000 is configured to cause at least two sparks to be generated for RPMs over 3,000, and at least one spark to be generated for RPMs at and above 15,000.

Ignition module 1000 is configured to convert a low electrical energy source 1008b, for example a direct current (DC) voltage from an external power source, for example the vehicle's battery, alternator, or other power source associated with the vehicle, into high alternating current (AC) electrical energy, for example a high AC voltage. The ignition module 1000 is configured to provide the high AC electrical energy to an ignition coil 1010. Ignition coil 1010 is operably coupled to one or more spark plugs, where each spark plug is in the combustion chamber of a cylinder. The high AC electrical energy has an energy level sufficient to cause multiple spark events to occur during a single combustion cycle of a cylinder. Ignition module 1000 receives one or more inputs 1008a from one or more external devices or sensors. The one or more external devices or sensors provide information and data regarding the engine's operating conditions. Ignition module 1000 is configured to manage and modulate the number of sparks, timing, and energy delivered to ignition coil 1010 responsive in part to the one or more inputs received by ignition module 1000 from the one or more external devices or sensors and thereby provide for complete combustion of every cylinder. Ignition module 1000 is also configured to monitor for misfires and take steps to mitigate misfires. Ignition module 1000 is also configured to identify other problems in ignition coil 1010, such as a defective or failed ignition coil, and take steps to alert a user of such problems.

Ignition module 1000 is configured to have at least three user-selectable operation modes. A first operation mode, or a default mode, provides a preset number of sparks based on an RPM input or engine load input from the one or more sensors or external devices. The energy level provided by ignition module 1000 to ignition coil 1010 is modulated based on the one or more received inputs from the external devices or sensors. For example, the energy level is modulated based on RPM and/or engine load. As a result, the first operation mode provides for a longer useful life of ignition components. The first operation mode may be suitable for normal driving conditions, i.e. non-high performance driving, and low RPMs and/or low engine load.

A second operating mode provides for a preset number of sparks per combustion cycle. In the second operation mode, the energy level provided to ignition coil 1010 is not modulated, rather the output energy level from ignition module 1000 is maintained at the maximum energy level capable of being produced by ignition module 1000. The second operation mode may be suitable for high performance driving such as street or strip vehicle racing or for occasional road racing. Due to the lack of modulation of the energy level to ignition coil 1010, some ignition component useful life is sacrificed.

A third operation mode provides for continuous spark events. A new spark cycle is initiated at the detected cessation of the previous spark oscillation cycle. The third operation mode may be suitable for high performance operation where maximum ignition energy is desired and ignition component useful life may be a secondary concern.

In another embodiment, ignition module 1000 is configured to delete, i.e. no spark provided, and rotate the deleted cylinder pairs in order to reduce the power output of the engine such that the engine cannot exceed any set RPM limits. Ignition module 1000 will delete and rotate the deleted cylinder pairs prior to meeting the set RPM limit in order to minimize any RPM overshoot. During the limiting event, no single of pair of cylinders is continuously deleted. Rather, each cylinder will fire at least once for every two combustion cycles of that cylinder. The deletion and rotation prevents any unburned fuel buildup in the non-firing cylinders and keeps all cylinders at an elevated temperature. Keeping all cylinders at elevated temperatures provides for easier restrike and less misfires in subsequent spark cycles for the cylinder.

As mentioned above, ignition module 1000 provides for the management and control of the electrical current used by ignition coil 1010 to cause multiple sparks in a spark plug operably coupled to ignition coil 1010 during a single combustion cycle of a cylinder in an internal combustion engine. Ignition module 1000 includes power circuit 1001 and control circuit 1005, as shown in FIG. 2A and demonstrative FIG. 2B, cooperating together to convert electrical energy having a first energy level, for example, the vehicle's DC low voltage battery or alternator power 1008$b$ into high voltage AC electrical energy sufficient to cause multiple or continuous spark discharges in a spark plug operably coupled to ignition coil 1010 at high RPMs.

Power circuit 1001 includes several sub-circuits cooperating together to provide the functionality described herein. Each sub-circuit may include one or more circuits or electronic components, such as, but not limited to, resistors, transformers, diodes, capacitors, inductors, etc. Power circuit 1001 includes conditioner circuit 1002, step-up circuit 1003, switching circuit 1004, and a monitoring circuit, which is a combination of current monitoring circuit 1006 in cooperation with current sensing circuit 1007. The functionality of the circuitry and sub-circuits as well as example circuitry configurations will be discussed further below.

FIGS. 1 and 2A depict general block diagrams of the interconnection of control circuit 1005 and power circuit 1001. It should be appreciated that the line depicting operable connection between each sub-circuit may actually include one or more operable connections between the sub-circuits. FIG. 2B depicts one demonstrative embodiment of a more detailed block diagram of control circuit 1005 and power circuit 1001.

The following paragraphs will generally discuss control circuit 1005, its function, and provide a brief description of the inputs 1008$a$ received from external devices and/or sensors (not shown), and control circuit's outputs 1009 to one or more external devices. A more detailed discussion of the one or more inputs of control circuit 1005 depicted in FIG. 2B is provided later in this document.

Control circuit 1005 may be any microcontroller or any application-specific integrated circuit (ASIC) capable of being programmed to carry out the following described functionality. Control circuit 1005 is configured to manage inputs 1008$a$ and outputs 1009 of ignition module 1000, and is configured to communicate and transfer recorded data regarding the performance of ignition module 1000 and an ignition system utilizing ignition module 1000 to an external computing device. As shown in FIGS. 1, 2A, and 2B, control circuit 1005 is electrically coupled to power circuit 1001 and is configured to provide one or more control signals to power circuit 1005, responsive in part to one or more inputs received from external devices 1008$a$ and/or from power circuit 1001.

Control circuit 1005, having software stored therein, provides the ability for ignition module 1000 to produce multiple high energy sparks during a single combustion cycle whose repetition, energy level, and timing may be varied via control circuit 1005, in response in part to any of the one or more inputs 1008$a$ and/or any predefined user controls set through software. Control circuit 1005 is configured to control and manage power circuit 1001 and to produce the highest energy spark necessary in order to optimize and achieve the engine's maximum performance in high performance modes without experiencing the extinguishment of a spark in turbulent conditions. Control circuit 1005 is also configured to modulate the spark generation energy level in order to increase the useful life of other ignition and engine components when operating conditions do not dictate full (or maximum) energy output. In addition, control circuit 1005 and power circuit 1001 are configured to monitor the electrical energy provided to ignition coil 1010 in order to determine and detect misfires or failure of the generated spark to ignite the combustible air/fuel mixture in a cylinder. Control circuit 1005 is configured to take steps to mitigate against misfire faults, including, causing another spark event to occur prior to the completion of the combustion cycle, inform the user or vehicle operator of a misfire, or modulate the timing and duration of spark events.

Control circuit 1005 is capable of receiving several inputs 1008$a$ from external devices and sensors which provide information and data relating to the operating parameters of the engine. Examples of inputs 1008$a$ received by control circuit 1005 are shown in FIG. 2B and a brief discussion for each input is provided below. It should be appreciated that the following is a non-exhaustive list of inputs for use by control circuit 1005. For example, inputs to control circuit 1005 may include information relating to the engine's RPM which may be provided from one or more engine speed sensors. Other inputs may include several types of user switch selectable and software settable RPM limiters that prevent the engine from exceeding pre-determined engine speeds. Use of RPM limiters may protect the engine from over-speeding and increase the overall vehicle performance in some high-performance operations. The external inputs 1008a and outputs 1009 of control circuit 1005 will be discussed later.

Control circuit 1005 is configured to communicate with an external computing device, such as for example, a laptop, desktop, tablet, or any electronic device containing a custom software program thereon configured to communicate with control circuit 1005, allow the user to modify software selectable parameters of control circuit 1005, and allow the user to read or export data collected by control circuit 1005. Other data links to provide for bi-directional communication of data between ignition module 1000 and the external computing device include Universal Serial Bus (USB), and wireless communication protocols, such as, but not limited to IEEE 802.11, IEEE 802.15.1, and IEEE 802.15.4.

Block diagrams of power circuit 1001 are depicted in FIGS. 1, 2A, and 2B. Power circuit 1001 converts the vehicle's low voltage battery, or alternator, power 1008b and raises it to a high voltage level sufficient to produce the energy level needed by ignition coil 1010 to provide multiple sparks and continuous sparks during a single combustion cycle in a cylinder. With references to the general block diagrams in FIGS. 2A and 2B, power circuit 1001 takes the unfiltered electrical energy of the vehicle's battery and conditions it with conditioner circuit 1002 for use by all components in ignition module 1000. A step-up circuit 1003 having a push-pull switching topology with a switching transformer steps-up the electrical energy of the vehicle's battery to a higher energy level. The stepped up DC electrical energy is provided to a switching circuit 1004 which switches the high DC electrical energy into an AC signal having the same high energy level of the stepped-up DC electrical energy. The high AC electrical energy is provided to an ignition coil 1010. Current sensing circuit 1007 and current monitoring circuit 1006 protect power circuit 1001 from short circuits, and cooperate together to monitor the current amplitude in the positive terminal 1010a of the primary winding of ignition coil 1010. The monitored current amplitude is provided to control circuit 1005 for detection of a misfire and provide control circuit 1005 with an indication of when a prior firing oscillation cycle (or prior spark cycle) has ceased.

Conditioner circuit 1002 is depicted in FIGS. 2A, 2B, 3, and 4. Conditioner circuit 1002 protects all sub-circuits of power circuit 1001 and control circuit 1005 from input over-voltages, transient over-voltages, and high frequency conducted noise or EMI (electromagnetic interference), all of which are possible in an automotive electrical system and could cause damage to or malfunction in ignition module 1001.

Over-voltages can be long term (e.g. seconds or continuous) or short term (e.g. milliseconds) depending on the condition that caused them. For example, over-voltages may be a result of a defective alternator, poorly regulated external battery chargers, or back-emf (electromotive force) of a starter motor during the cranking cycle. Transient over-voltages tend to be short term high amplitude "spikes" that can exceed $100V_{DC}$ (Volts Direct Current) and inflict severe damage to any circuitry connected to the automotive electrical system. A variety of causes exist that generate voltage "spikes" including a failing alternator/generator, starter motors during cranking, "jump starting" a vehicle with a dead battery and various short circuit conditions in the vehicle's electrical system. A condition known as an alternator "load dump" occurs when the vehicle is turned off, which can generate as much as $150V_{DC}$ for many milliseconds. In addition to the previously discussed examples, conditioner circuit 1002 protects ignition module 1000 from negative voltage transients that may be present in the an automotive electrical system.

Conditioner circuit 1002 receives electrical energy from an external power source 1008b, for example, the vehicle's battery, indicated with "+Battery" "−Battery", as shown in FIGS. 1, 2A, 2B, 3, and 4. The external power source may also be from the vehicle's alternator. As used herein, "external power source" means a power source external from ignition module 1000. Conditioner circuit 1002 "cleans" drawn electrical energy from the external power source, which may be in a range of about $8.0V_{DC}$ to about $22.0V_{DC}$, and removes any spikes and noise therefrom. The output of conditioner circuit 1002 is clean DC electrical energy having the same energy level of the input energy level from the external power source.

Figure 4B:
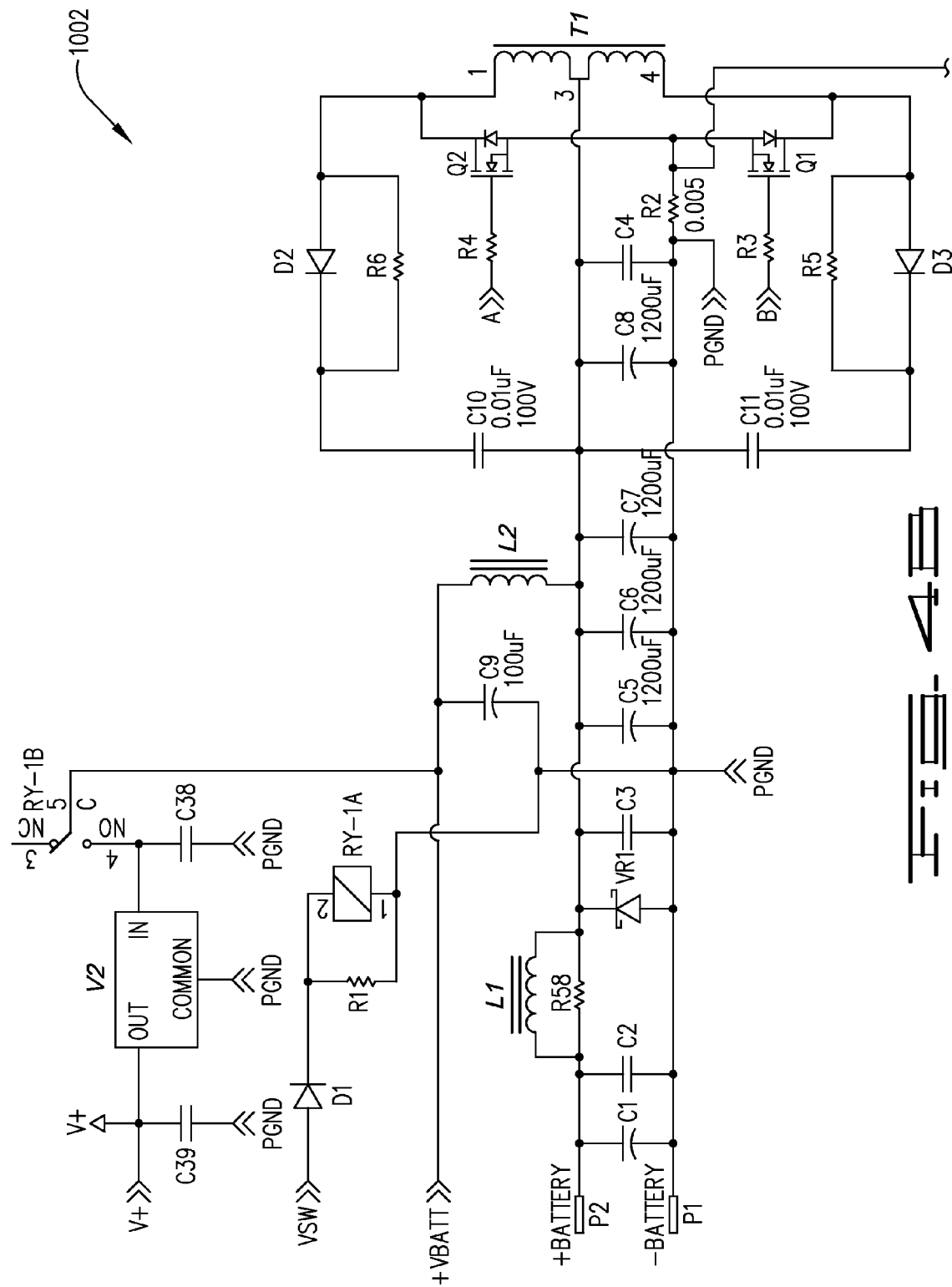

A demonstrative embodiment of the components of conditioner circuit 1002 is shown in FIGS. 3, 4A, and 4B. It should be appreciated that other circuitry configurations and component values that achieve the described functionality of conditioner circuit 1002 are also suitable. With reference to FIGS. 3 and 4A, the components that may comprise conditioner circuit 1002 include: fuse F1 (external to ignition module 1000 and user replaceable), inductors L1 and L2, capacitors C1 through C4, resistor R58, and TVS (transient voltage suppressor) diodes VR1 and VR2. Capacitors C1-C4 may be very low ESR (Effective Series Resistance) and ESL (Effective Series Inductance) ceramic capacitors that act to slow down the rise time of any voltage transient as well as shunt high frequency noise or EMI to ground. The inductors prevent the transfer of any switching noise, EMI, or back-EMF of ignition module 1000 to the vehicle. Inductor L1 and capacitors C3-C8 form a first LC filter that dampens any incoming fast rise time voltages and currents. Resistor R58 serves to dampen any back-EMF that inductor L1 generates from the fast decay of a transient. It should also be appreciated that inductor L1 may be wound on a type of powdered iron core material that is effective at "absorbing" high frequency noise or EMI. Inductor L2 and capacitor C9 form a second LC filter that further protects the more sensitive internal circuitry of ignition module 1000. The output of the second LC filter is named "+Vbatt". VR1 and VR2 are TVS clamps are power absorbing to both short and long term over-voltages to a level that the ignition module's 1000 circuitry can tolerate without damage or malfunction, e.g. up to about $30.0 V_{DC}$, preferably up to about $26.0V_{DC}$. In the depicted embodiment, VR1 is a 3 KW (kiloWatt) device that begins clamping just above $24.0V_{DC}$ and VR2 is a 1.5 KW device across +Vbatt that begins clamping just above $22.0V_{DC}$. In another configuration, VR1 and VR2 may begin clamping just above $22.0V_{DC}$ and just above $18.0V_{DC}$, respectively. Along with inductors L1 and L2, VR1 and VR2 can effectively limit over-voltages. In addition, the combination of the inductors and VR1 and VR2 also defend against negative polarity transients since the TVS diodes become forward biased and clamp the voltage to less than about $1.0 V_{DC}$. In the case of a long term severe over-voltage above VR1 and VR2's clamping point, fuse F1 is sized to become open circuit before the TVS diodes fail. Also, F1 will fail when ignition module 1000 is wired in reversed polarity as the TVS diodes are then forward biased. Any fuse failure should alert the user of an electrical fault with the vehicle and/or ignition module 1000. In another embodiment, as shown in FIG. 4B, VR2 may be removed and an active device, such as 3-terminal low-dropout (LDO) regulator, labeled as V2 in FIG. 4B, and two capacitors, C38 and C39, are included to help keep oscillations down. As previously discussed, it should be appreciated that a variety of circuitry configurations and values for components that are capable of providing the described functionality are also suitable.

Relay RY1, reverse polarity protection diode D1, and relay coil back-EMF damper R1 are also part of conditioner circuit 1002. These components allow for a non-conditioned voltage key-on or ignition-on voltage source from the vehicle labeled "Vsw" to energize the coil of RY1 through D1 and operate the relay to connect the voltage "+Vbatt" to the "V+" supply and power the circuitry of ignition module 1000. As a result, the "V+" voltage is always conditioned. "Vsw" is also an input to control circuit 1005 as shown in FIG. 2B.

Conditioner circuit 1002 is operably connected to step-up circuit 1003. The clean or conditioned DC voltage from conditioner circuit 1002 for the demonstrative embodiment is in the range of about 8.0 $V_{DC}$ to about 20.0$V_{DC}$. The cleaned or conditioned DC voltage is provided to step-up circuit 1003. Step-up circuit 1003 of this embodiment is configured to step-up the voltage anywhere between 0.0$V_{DC}$ to 500.0$V_{DC}$, preferably between 250.0$V_{DC}$ (±20V) up to about 500.0$V_{DC}$ (within −20V, i.e. 480$V_{DC}$). A schematic illustration of step-up circuit 1003 is shown in FIGS. 3 and 5.

This step-up conversion is accomplished using a pulse-width-modulated (PWM), voltage regulated, current-mode, push-pull forward converter topology with current limiting and short circuit protection. Step-up circuit 1003 is capable of having its high voltage output controlled from nearly 0.0$V_{DC}$ to 500.0$V_{DC}$ by an external PWM signal from control circuit 1005, labeled as "PWM HV Control". The PWM HV Control is a frequency signal, e.g. a 250 KHz signal, used to modulate the +HV or high voltage rail on power circuit 1001. As will be discussed later, the value of the +HV rail is representative of the energy level output to ignition coil 1010. Various input parameters 1008a, which will be discussed further below, including the RPM and MAP sensor values, may be used by control circuit 1005 to adjust the value of the +HV rail and thereby achieve active modulation of the +HV rail and output energy to ignition coil 1010.

Step-up circuit 1003 includes two sub-circuits: PWM controller integrated circuit and its associated parts, and the DC input push-pull forward voltage step-up converter including a low voltage DC input switching stage and an output rectification and a filtering stage. With reference to FIG. 5, the PWM controller includes integrated circuit IC1 which may be a Linear Technology LTC3721-1, or another integrated chip (IC) or group of ICs providing equivalent functionality. The regulated input voltage provided to IC1 is provided to terminal labeled "Vcc". The voltage regulator circuit operates from "V+" and supplies +10$V_{DC}$ to IC1. The voltage regulator circuit includes transistor Q5, Zener diode VR4, and resistors R24 and R25. IC1 may operate at a frequency of about 95.0 KHz to about 105.0 KHz as determined by capacitor C25, although its two push-pull outputs (DRV A and DRV B) controlling the switching devices Q1 and Q2 operate at about half the frequency of IC1. IC1 includes an under-voltage lockout (UVLO) input that inhibits operation until the input voltage reaches at least 7.90$V_{DC}$. The UVLO voltage value is set by the resistor divider consisting of R26 and R27 and has a filtering capacitor C23.

IC1 includes a soft-start (SS) feature that slowly increases IC1's output pulse widths to the DC switching devices, Q1 and Q2, from 0% duty-cycle at start-up of ignition module 1000 to the duty-cycle necessary to reach the commanded output voltage (e.g. 0-500$V_{DC}$) as dictated by control circuit 1005 through R39. For example, 100% duty cycle corresponds to a commanded output voltage of about 500$V_{DC}$. This feature ensures that there is not a large current inrush when ignition module 1000 is first turned on because it slowly charges the output filter capacitors. Since IC1 is a current-mode PWM controller, the transformer primary switching current is sensed through resistor R2 ensuring that the core of switching transformer T1 does not approach magnetic saturation due to flux asymmetry, and thereby ensures efficient operation of step-up circuit 1003.

The current sense signal from R2 is fed back into the PWM controller IC1 as a variable current through R31 to provide slope-compensation in order for IC1 to remain stable at high PWM duty-cycles. Resistor R32 provides a pull-up current to the CS (current sense) pin of IC1 to set both the pulse-by-pulse current limiting which will foldback or decrease the allowable output current for as long as necessary and the short circuit current limiting cycle that puts IC1 back into a soft-start mode when a short circuit is detected. IC1 will remain continuously in this "hiccup" mode until the short circuit is removed or ignition module 1000 is turned off, thus preventing the DC switching devices, Q1 and Q2, from failing.

IC1 also includes several voltage feedback loop components, including an output voltage modulation circuit. The feedback loop monitors the output voltage of step-up circuit 1003 and allows IC1 to maintain the desired output voltage, as determined by control circuit 1005, by varying the duty-cycle (on-time of the switching signal to Q1 and Q2 versus the total time of the clock cycle as determined by the operational frequency). This is achieved by dividing the high voltage output rail (+HV) down to the 1.2$V_{DC}$ threshold for an output voltage of about 500$V_{DC}$. The components R12, R13, R14, and R15 accomplish the voltage divider and feed it to the inverting input of operational amplifier (op-amp) IC2B, which may be a Microchip MCP602 or equivalent, via resistor R59. In order for the feedback loop to remain stable through all conditions of voltage and load output, IC2B has a compensation loop filter in its feedback loop consisting of resistors R59, R33, R34, and R16 and capacitors C28, C29, and C15. The compensation loop filter maintains the correct loop gain and phase to ensure both stable and accurate voltage regulation without any oscillations. The reference voltage for this op-amp is generated by the PWM signal from control circuit 1005 labeled as "PWM HV Control" which is, for example, a 250 KHz digital signal having a duty-cycle that can vary from 0% to 100% to attain the desired output voltage of 0.0 $V_{DC}$-500 $V_{DC}$. The PWM HV Control signal is filtered by a 2-pole filter circuit formed by resistors R36, R37, R38, and R39 and capacitors C30 and C31 into the non-inverting input of IC2A to achieve a 0.0$V_{DC}$ to 1.20$V_{DC}$ reference voltage for IC2B to use to set the output voltage for step-up circuit 1003. IC2, which is a chip containing op amps IC2A and IC2B, is powered by the Vref+5$V_{DC}$ output of IC1 with capacitor C27 as its decoupling capacitor.

The second sub-circuit of step-up circuit 1003 includes a low voltage DC input push-pull switching stage comprised of power MOSFETs Q1 and Q2 which are connected in a common source configuration. MOSFETs Q1 and Q2 are connected to power ground (labeled as PGND) through current sense resistor R2. The drains of Q1 and Q2 are connected to each outer winding, winding #1 and #4, respectively, of transformer T1's primary winding. The conditioned voltage from conditioning circuit 1002 is applied to the center tap, winding #3, of transformer T1. The above described configuration forms form the push-pull topology. In addition to input conditioning, capacitors C3 through C8 serve as the primary center tap filter and decoupling capacitors. A snubber network on each drain of the power MOSFETs limit any voltage overshoots or high frequency ringing caused by the leakage inductance of T1. These snubber networks absorb and dissipate energy which could damage the power MOSFETs or cause excessive EMI. The snubber networks include resistors R5 and R6, capacitors C10 and C11, and ultrafast recovery diodes D2 and D3. The gates of the two MOSFETs are connected through gate drive resistors R3 and R4, respectively. Resistors R3 and R4 connect to the gate drive output pins DRV A and DRV B of IC1 in order to activate the gate of each power MOSFET in an alternating fashion.

On the secondary side of transformer T1 is the output rectification and filtering stage. The output rectification and filtering stage includes a half-bridge rectifier pair D4 and D5 connected to windings #12 and #8, respectively to rectify the square wave AC pulses from the grounded center-tap secondary winding #10 of transformer T1 into a pulsed DC output. In this embodiment, transformer T1 has a winding ratio from primary to secondary of 1 to 41; as a result, the peak voltage of the rectified pulse is approximately 41V for each one volt applied to the primary. This voltage may be minimally diminished as a result of the winding resistance of T1 and the forward voltage drop of diodes D4 and D5.

The pulsed DC output from the rectifiers is integrated by inductor L3 and filtered by capacitors C12 and C13 into a nearly ripple-free DC voltage and current. The action of L3 is where the PWM duty-cycle is translated into the desired output voltage as indicated by the formula $V_{out}=V_{in}*(\%$ Duty Cycle). In this embodiment, due to the high voltage value and limited space available within ignition module 1000, the two $350V_{DC}$ rated capacitors, C12 and C13, are connected in series with resistors R7 and R8 in order to force the voltage across each capacitor to be nearly equal. Other configurations that provide the same described result and functionality are also suitable.

Diodes D6 and D7 prevent any polarity reversal on capacitors C12 and C13 during anomalous circuit operation, such as a short circuit. Further high frequency filtering is provided by capacitors C14 and C37. C14 and C37 may be low ESR/ESL ceramic capacitors. As shown in FIGS. 3 and 6, the DC output of this stage is labeled as "+HV". The +HV is the high voltage rail that is applied to switching circuit 1004 and has an energy level that is the same as the output energy level of ignition module 1000 to ignition coil 1010. This stage includes two separate resistor divider networks, the first divider network of R12, R13, R14, and R15 was previously discussed, which provides IC1's feedback loop. The second resistor divider network includes R9, R10, and R11. This resistor divider network provides for high voltage monitoring by control circuit 1005 and is labeled "HVFB". HVFB is a low voltage representation of ignition module's 1001 +HV high voltage rail value. Control circuit 1005 uses this signal to monitor and modulate the +HV high voltage rail.

Step-up circuit 1003 provides the stepped-up DC voltage to switching circuit 1004. FIGS. 2A, 2B, 3, and 6 include switching circuit 1004 which includes two switching elements, Q3 and Q4, which are insulated gate bipolar transistors (IGBTs) in a half-bridge arrangement. As managed by control circuit 1005, Q3 and Q4 are switched on and off in an alternating fashion such that Q3 and Q4 are not conducting at the same time. Control circuit 1005 determines and manages the timing, duty-cycle, and repetition rate of Q3 and Q4. As shown in FIG. 6, the IGBT half-bridge is connected to the high voltage output +HV from step-up circuit 1003 and grounded through power ground (PGND). As shown in FIG. 6, the emitter of the upper IGBT, Q3, is not ground-referenced like the emitter of the lower IGBT, Q4.

Figure 8:
FIG. 8 shows an example waveform of the output voltage from the switching circuit of the power circuit across an ignition coil.

FIG. 8 depicts the output voltage waveform that is provided to 1010a of ignition coil 1010. Ignition coil 1010 further transforms this output electrical energy into a much higher electrical energy level, for example between 40,000-60,000 volts, to discharge multiple or continuous sparks in the spark plug operably connected to the secondary side of ignition coil 1010.

To drive the gates of the IGBTs, a high voltage half-bridge driver integrated chip, IC3, is employed to supply the necessary gate drive voltages to Q3 and Q4. The input of IC3 is directly controlled by the control circuit 1005 via the "Enable" and "Fire PWM" control signals. The Enable signal from control circuit 1005 enables the half-bridge IGBT driver in IC3 receptive to receive PWM signals from control circuit 1005. The Enable signal is received at pin 3 of IC3 labeled "SD". Fire PWM provided by control circuit 1005 to IC3 at pin 2, labeled "IN" is used to control the conduction states, e.g. switching states, of Q3 and Q4 in order to generate the desired number and duration of sparks in ignition coil 1010. In one embodiment, the Fire PWM signal is configured to remain high for up to 500 microseconds for each spark event. It should be appreciated that the duration of the Fire PWM signal may be modulated by control circuit 1005 depending on operating mode, received inputs, and/or user selection.

With reference to FIG. 6, during operation, the upper IGBT, Q3, has its collector connected to the high voltage output (+HV) of step-up circuit 1003. The emitter of Q3 is connected to the collector of Q4, the lower IGBT. The emitter Q3 is also connected to one side of decoupling capacitor C19. The other side of capacitor C19 connects to the ignition coil's positive input 1010a. A bleeder resistor R22 is across C19 to discharge C19 after turn-off of ignition module 1000. The emitter of Q4 is connected to the ground of switching circuit 1003 (labeled as PGND) to form the half-bridge output driver pair. The gate of Q3 is connected to HO (high out) pin-7 of the half-bridge driver IC3 via a gate drive resistor/diode network consisting of resistors R20 and R23 and diode D11. This network allows Q3 to be turned off at a faster rate than it is turned on. As a result, during the recovery period of the co-packed ultrafast diode in Q4, the ultrafast diode in Q4 experiences less stress from the diode recovery current component and EMI from Q3's turn on, and is not prone to unnecessarily higher switching losses during the turn-off transition of Q3.

Q4 has a single gate drive resistor R21 from IC3 LO (low out) pin-5. The turn on and turn off rate is the same for Q4. Q4 conducts much less diode recovery current from the co-packed ultrafast diode in Q3. Q4 has a Zener diode across its gate and emitter to prevent overvoltage events that can occur in the lower IGBT, Q4.

The half-bridge driver IC3 provides the necessary gate drive voltage for Q3 by using a common method known in the art as "bootstrapping". IC3 charges a bootstrap capacitor C18 through the current limiting resistors R18 and R19 and ultrafast bootstrap diode D9. Upon applying V+ power to IC3's $V_{cc}$ voltage input pin-1, and after the Enable pin-3 is brought high by control circuit 1005 (i.e. receives a high signal from control circuit 1005), the bootstrap capacitor is charged to $V_{cc}$ minus the bootstrap diode drop of about 0.7$V_{DC}$. At about the same time, the $V_s$ pin-6 is pulled to ground through R19 with Q4 now conducting. As used herein, "high signal", "low signal" or "brought high" or "pulled low" means a logical high or logical low. The voltage values representing the high or low signals may vary per the operation of the integrated circuit receiving the signal.

When Q4 is turned off and Q3 is then turned on, diode D9 is reversed biased while $V_s$ and the bootstrap capacitor are elevated to the same voltage level as the emitter of Q3, which is rising towards the voltage level of +HV. The bootstrap capacitor retains a voltage charge of $V_{cc}$–0.7$V_{DC}$ ("$V_{cc}$ minus 0.7$V_{DC}$") which is sufficient to drive Q3's gate. Bootstrap capacitor C18 is then recharged every time Q3 turns off and Q4 turns on. The capacitors C16, C17 across $V_{cc}$ and grounded COM pin-4 serve to provide decoupling for IC3 as well as a charge reserve for the bootstrap capacitor.

Resistor R18 limits the maximum capacitor charging current to prevent a possible IC3 failure mode and resistor R19 also limits the charging current while protecting the $V_s$ node from over-currents during startup of ignition module 1000 and short circuit events. Diode D10 provide further protection of IC3 by preventing the $V_s$ node from voltage excursions below the grounded COM pin-4. Such a voltage excursion will result in failure of IC3. Since Q4's emitter is referenced to power ground (PGND), the gate drive circuit for Q4 applies $V_{cc}$ to Q4's gate.

Depending of the operation mode of ignition module 1000, the output of switching circuit 1004 produces either a preset number of spark restrikes versus RPM or engine load with voltage modulation of +HV (first operation mode), a preset number of spark restrikes (second operation mode) independent of one or more inputs 1008a, e.g. RPM or engine load, and the +HV rail is not modulated, and/or continuous spark cycle mode (third operation mode).

FIG. 9 depicts a simplified state diagram of switching circuit 1004 at power-on of ignition module 1000. At power-on of ignition module 1000, the Enable control signal and Fire PWM control signal from control circuit 1005 are both low and, as shown in FIG. 9, both Q3 and Q4 are non-conducting. When the Enable control signal is pulled high by control circuit 1005 and Fire PWM remains low, only IGBT Q4 conducts as shown in FIG. 10. With reference to FIG. 6, during the initial power-on of ignition module 1000, pull-down resistor R17 provides that pin 2 of IC3 remains low to avoid any errant spark events in ignition coil 1010. As will be discussed later, the "Enable pin-3 of IC3 can be pulled low by the "Output Fault" signal when an output overcurrent is detected.

Figure 13:
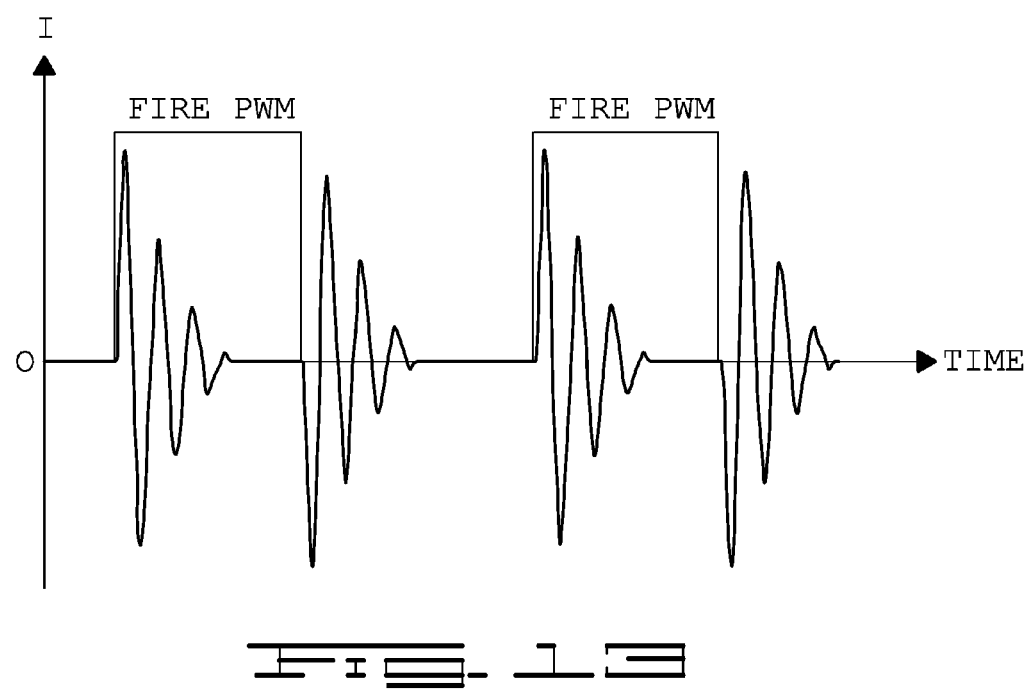
FIG. 13 illustrates a damped oscillation waveform of the spark current provided to the ignition coil for a single combustion cycle in a cylinder as measured by the monitoring circuit.

In FIG. 11A, when the Enable control signal is high, and control circuit 1005 brings the Fire PWM control signal high in response to an ignition trigger event based in part on one or more inputs 1008a or in response to an input from power circuit 1001, Q4 ceases conducting and IGBT Q3 begins conducting after the intrinsic 540 nanosecond dead-time inserted by IC3. The 540 nanosecond dead-time prevents Q3 and Q4 from conducting simultaneously. As a result, the grounded primary of ignition coil 1010 is charged though capacitor C19 and the initial spark current is generated. FIG. 11B depicts the equivalent circuit of FIG. 11A when Q3 is conducting. With reference to FIG. 13, the Fire PWM control signal from control circuit 1005 is held high for up to 500 microseconds as determined by the control circuit 1005. In one embodiment, the duration of Fire PWM is fixed at 400 microseconds, for the first and second operation modes, but can be modified via software by the user and as a result of the active modulation of power circuit 1001 in order to produce the most effective spark energy for current operating conditions.

With reference to FIGS. 11A, 11B, and 13, while the Fire PWM control signal is high, capacitor C19 and the ignition coil's inductance form a parallel LC resonant circuit with C19 connected through Q3 and its co-packed anti-parallel diode to the +HV low impedance node. As a result, a damped sinusoidal oscillation is produced as shown in FIG. 13. This damped sinusoidal oscillation provides a continuous AC spark current or arc until the oscillation finally dampens below a minimum threshold. The oscillation frequency is determined by the value of capacitor C19 along with the ignition coil's overall inductance. The amplitude depends on the initial charge of the coil which is proportional to the +HV voltage. The oscillation duration depends on the coil's primary and secondary resistances as well as the value of the spark current.

When control circuit 1005 brings the Fire PWM control signal low, Q3 ceases to conduct and Q4 begins conducting approximately 540 nanoseconds later and C19 is connected to ground. FIG. 12A depicts the simplified state diagram of Q4 conducting with FIG. 12B representing the equivalent circuit. As shown in FIG. 13, when Q4, begins conducting, another spark current of opposite polarity as the positive charge on C19 (+HV) is discharged to ground by Q4. Once again a damped sinusoidal oscillation occurs through Q4 and its co-packed anti-parallel diode forming a parallel LC resonant circuit with ignition coil 1010 as shown in FIG. 12B.

As shown in FIG. 13, two Fire PWM control signals are provided, meaning there are two periods of Q3 conducting during the combustion cycle. The damped oscillations when the Fire PWM control signal is low is representative of two periods of Q4 conducting. As a result, FIG. 13 depicts approximately 4 sparks generated by ignition module 1000 per single combustion cycle in a cylinder. With reference to Table 1 in the eight-cylinder engine, these 4 sparks will occur in each cylinder for RPMs between 1,875-3,749. The timing and number of sparks per RPM can be adjusted as described herein.

Figure 14:
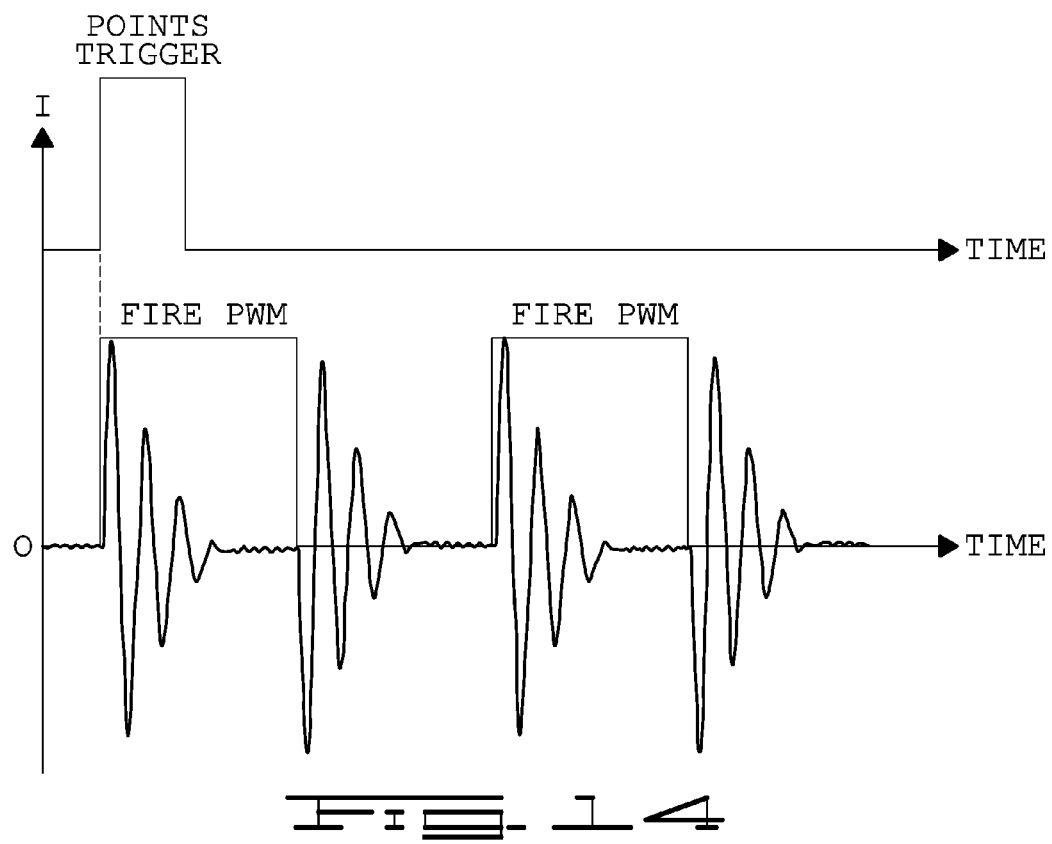
FIG. 14 illustrates a damped oscillation waveform of the spark current provided to the ignition coil as measured by the monitoring circuit depicting a preset number of sparks generated in response to a single trigger signal.
Figure 15:
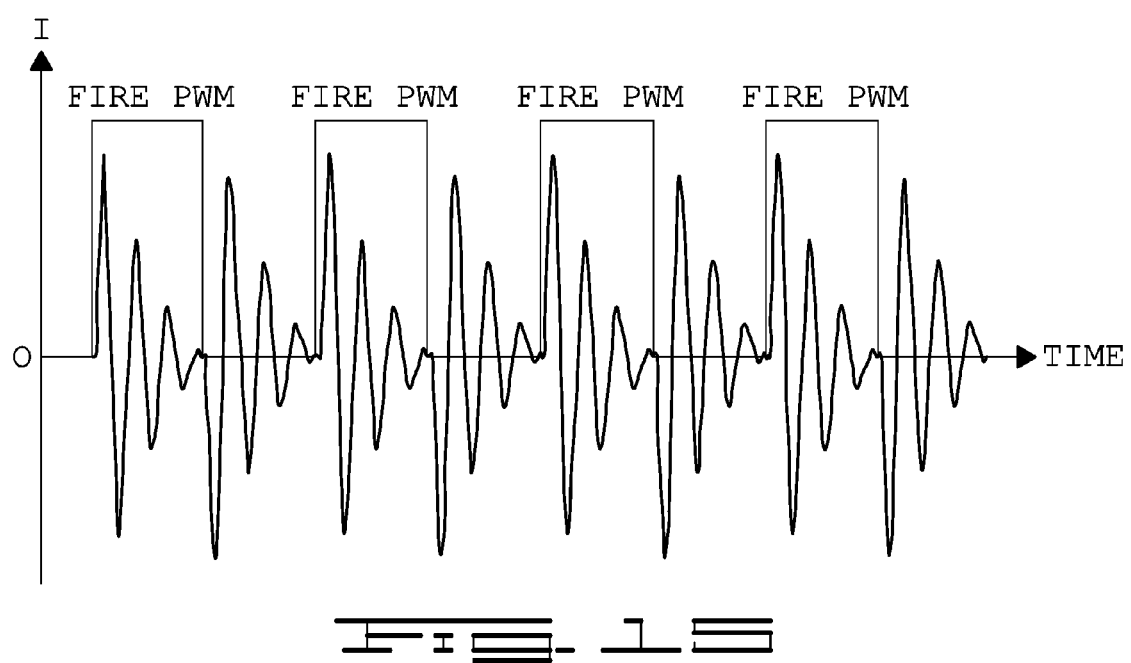

The duration of the Fire PWM control signal may be altered, for example, lengthened or shortened via the software (control logic) in control circuit 1005 to provide for a continuous spark during the first few degrees of crank rotation after an ignition trigger event or signal. Control circuit 1005 is configured to provide active modulation of the Fire PWM control signal by monitoring output current of ignition module 1000 to ignition coil 1010 to determine when the damped oscillation is of sufficiently low amplitude (falls below a predefined threshold) that another spark can be initiated. The result of the active modulation allows ignition module 1000 to produce the most spark energy in the shortest time after an ignition trigger signal. FIG. 14 is demonstrative of how quickly the first spark starts in response to an ignition trigger event occurring, for example the points input to control circuit 1005. FIG. 14 depicts the Fire PWM control signal overlaying the damped oscillation of the current. On the separate x-axis in FIG. 14 is the "points trigger" signal. As shown in FIG. 14, the response to initiate a firing even is almost simultaneously, for example, depending on the ASIC processor speed in control circuit 1005, the response time may be about 12 microseconds. The width or time duration that the "points trigger" is high is variable depending on the dwell time for the particular points ignition system. As used herein, an ignition trigger signal is any signal that is synchronized with the engine's rotation that causes a timed spark. In addition, this configuration compensates for high cylinder pressures where the damped oscillation might terminate earlier in the event there was no active modulation.

Current monitoring circuit 1006 and current sense circuit 1007 cooperate together to monitor the output current from switching circuit 1004. The combination of current sense circuit 1007 and monitoring circuit 1006 will be referred to as "monitoring circuit". Monitoring circuit provides for the detection of misfires or absence of any spark generation in a cylinder(s) which can be used by control circuit 1005 to alert the user of an ignition event problem, and/or attempt to correct the problem by generating (or causing to be generated) additional sparks to the affected cylinder(s) prior to the completion of the affected cylinder(s) combustion cycle. Monitoring circuit is configured to detect when and provide an indication of when a prior firing (or spark) cycle has ended. In addition, monitoring circuit can also detect failing or improper ignition coils that could eventually overstress switching circuit 1003. In the case of a shorted ignition coil primary, or user induced short circuit, monitoring circuit, via control circuit 1005 will shut down ignition module's 1000 output and issue a fault warning to the user.

Figure 7:
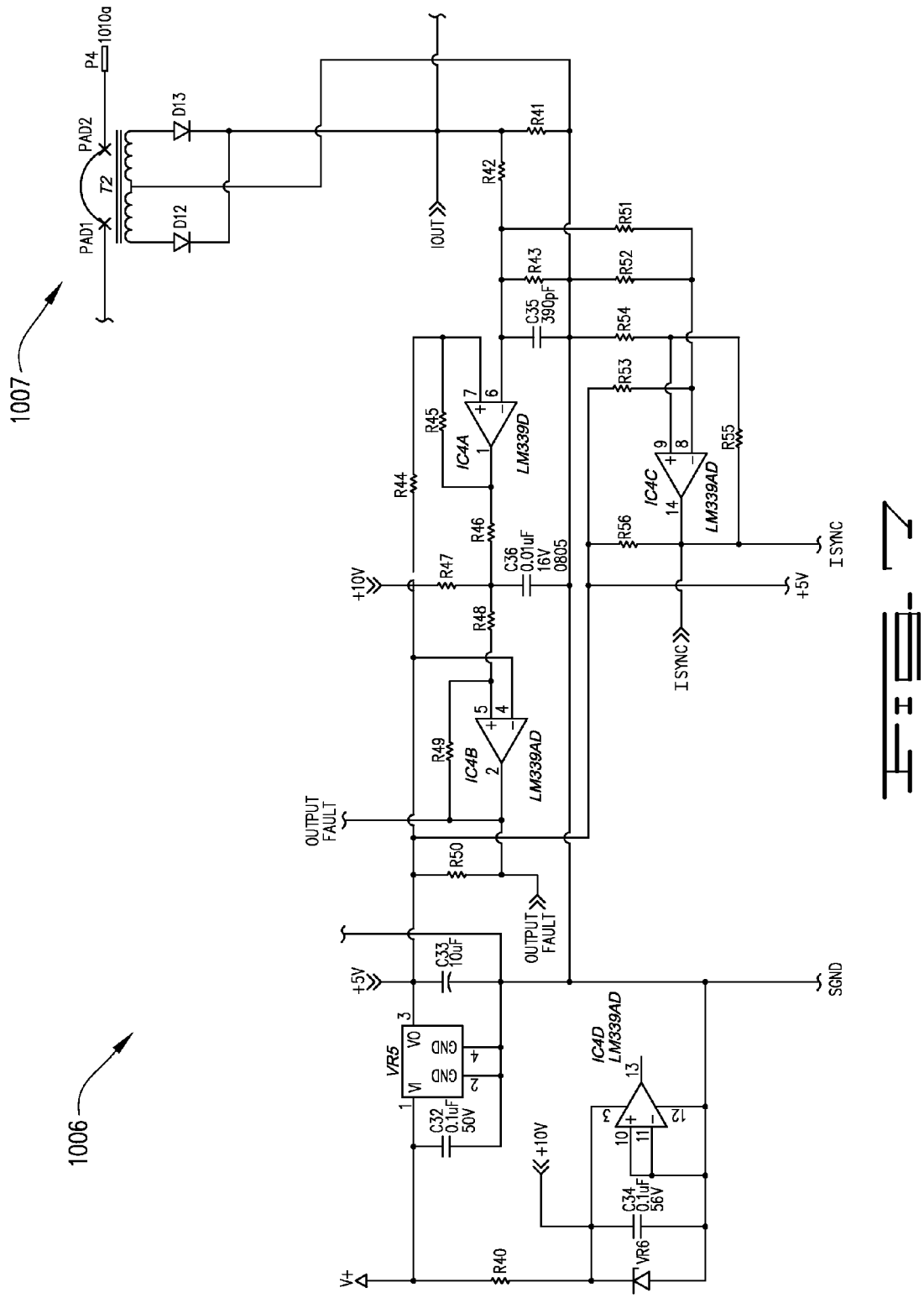
FIG. 7 depicts a schematic illustration of an embodiment of a monitoring circuit in the power circuit.

The following will discuss the schematic illustration of current monitoring circuit 1006 and current sense circuit 1007 in relation to FIGS. 3 and 7. The output current from switching circuit 1004 is measured using a bipolar current sense transformer 1007, also referred to as T2 to provide a way of limiting the peak output current by terminating the output of IC3 and to provide the signal "Iout" to control circuit 1005 in order for it to monitor and display both the output current amplitude and frequency. The monitoring circuit is comprised of a peak voltage comparator and a zero-crossing detector. The zero-crossing detector triggers (e.g. becomes high for positive current amplitude and becomes low for negative current amplitude) each time the output waveform approaches 0 Amperes current. No zero-crossing may be indicative that there is no spark current, and that the prior spark cycle has ceased or a misfire has occurred.

The output current amplitude can be used to control the output voltage value (+HV) of step-up circuit 1003 via the "PWM High Voltage (HV) Control" signal. The modulation of the output voltage value of step-up circuit 1003 decreases the output energy (or spark energy) to ignition coil 1010 and duration of each spark cycle during light throttle operation of the vehicle in order to reduce stress on all other ignition components and thereby increase the useful life of the ignition components.

The zero-crossing detector and bipolar current sense transformer provide control circuit 1005 a way to detect a "misfire" or absence of any spark generation in a cylinder(s) which can be used by control circuit 1005 to alert the user of an ignition event problem, such as a weak spark or insufficient spark energy; and/or try to correct the problem by generating additional sparks to the affected cylinder(s). The Iout signal is provided to control circuit 1005 and represents a value proportional to the current flowing through ignition coil 1010. For example, control circuit 1005 is configured to contain threshold values of Iout representing normal operation conditions for varying engine sizes, RPMs, and engine loads. The monitoring of Iout by control circuit 1005 may identify a weak spark (diminished output current) which results in less output energy. The weak spark may be the result of a fouled spark plug or other mechanical failure. As a result, control circuit 1005 is configured to provide the user with an alert or indication of component failure such that the user can locate the identified problem within the vehicle's engine.

To detect for overcurrent, the output from switching circuit 1004 coupled to the positive terminal 1010*a* of the primary side of ignition coil 1010, is fed through the primary winding of bipolar current sense transformer T2. As shown in the figures, the primary winding of T2 is represented as PAD 1 and PAD 2, which is a single turn. The 50 turn center tapped secondary of T2 is grounded and two ultrafast diodes on the winding ends pins 1 and 3 form a half-bridge rectifier across whose output is a "burden" resistor R41 that sets the current to voltage ratio. For the depicted demonstrative embodiment for the 8 cylinder engine, R41 is a 25 Ohm resistor that sets the ratio to 1 Volt=1 Ampere which appears as the signal "Iout". Control circuit 1005 uses Iout to detect cylinder misfire and coil over-currents.

Resistors R42 and R43 form a resistor divider from Iout to the inverting input pin-6 of comparator IC4A which is one-fourth of an LM339AD integrated circuit chip. Capacitor C35 filters any noise on the inverting input pin-6. The non-inverting input pin-7 uses +5V$_{DC}$ as a reference voltage through resistor R44 from voltage regulator VR5. When the divided voltage at the comparator's inverting input pin-6 exceeds the reference voltage at the non-inverting input pin-7, the output, pin-1, pulls to ground or low. As a result, of pin-1 pulling low, timing capacitor C36 discharges through resistor R46. The duration, amplitude, and repetition of the overcurrent event(s) determines how deeply timing capacitor C36 is discharged. Pull-up/charging resistor R47 determines the charging rate of the timing capacitor C36 and acts with resistor R45 to provide hysteresis to the comparator to prevent oscillation.

The voltage across capacitor C36 is input to the non-inverting input pin-5 of comparator IC4B through resistor R48. When C36 is discharged below the +5V$_{DC}$ reference voltage present on the inverting input pin-5, the output pin-2 of the comparator IC4B pulls low which also pulls the Enable pin-3 of IC3 low to terminate spark generation for a period determined by how deeply C36 is discharged and the time constant of R47 and C36. This signal is supplied to the control circuit 1005 as "Output Fault". Thus, the more severe the overcurrent, the longer IC3 is inhibited from outputting and thereby allows the IGBTs in switching circuit 1004 time to cool. Pull-up resistor R50 along with resistor R49 provide hysteresis for comparator IC4B. Diode D8 allows control circuit 1005 to independently control the Enable pin-3 of IC3. Alternatively, control circuit 1005 may directly control the Enable pin-3 of IC3 without the need of diode D8.

The zero-crossing detector monitors the output current at the R42/R43 divider node through resistor R51 and further divided by resistor R52 to IC4C inverting input pin-8 allowing adjustment to the zero-crossing threshold. The inverting input pin-8 is also biased by resistor R53 to +5V$_{DC}$ to set the switching threshold. Resistors R54 and R55 connect to the non-inverting input pin-9 to provide hysteresis along with pull-up resistor R56 on the output pin-14. The output of IC4C is labeled "ISync" and connects to control circuit 1005. Thus, the output of the zero-crossing detector pulls low every time the voltage at inverting input pin-8 approaches zero volts and returns to the high (+5V$_{DC}$)

state as the input voltage increases above 0 volts and thereby producing a low-going pulse between current pulses. The ISync signal provided to control circuit 1005 a representation of the frequency of the current pulses flowing through ignition coil 1010. The ISync signal, in conjunction with the Iout signal is used to detect a misfire. In addition, ISync may be used to time the spark restrike to coincide with the end of the prior damped spark current oscillation cycle and thereby provide a continuous spark depending on the operation mode selected by the user. For example, in an 8-cylinder engine, the spark firing events may be maintained throughout 22.5 degrees of crankshaft rotation.

The quad comparator IC4 is powered through a resistor R40 and regulated by Zener diode VR6 to supply approximately +10V with capacitor C34 as a decoupling capacitor. The fourth unused comparator section's inputs are grounded. The $+5V_{DC}$ reference voltage used by the comparators is produced by a voltage regulator VR5 which is powered by V+ and has decoupling capacitor C32 on its input and C33 on its output.

As previously mentioned, FIG. 13 depicts the current waveform from ignition module 1000 with the overlaying control signals from control circuit 1000. As previously discussed, FIG. 14 depicts another current waveform representing a spark cycle or spark event for a single combustion cycle where a preset number of sparks are generated in response to a single trigger event. The trigger event signal is on the x-axis above the damped oscillating current waveform in FIG. 14. As shown in FIG. 14, 4 sparks are generated. In the first operation mode, the +HV rail is modulated by control circuit 1005 between, for example $250V_{DC}$ and $500V_{DC}$. In the second operation mode, a preset number of sparks are generated, however, the +HV rail is maintained at the highest voltage level, for example $500V_{DC}$.

Figure 15:
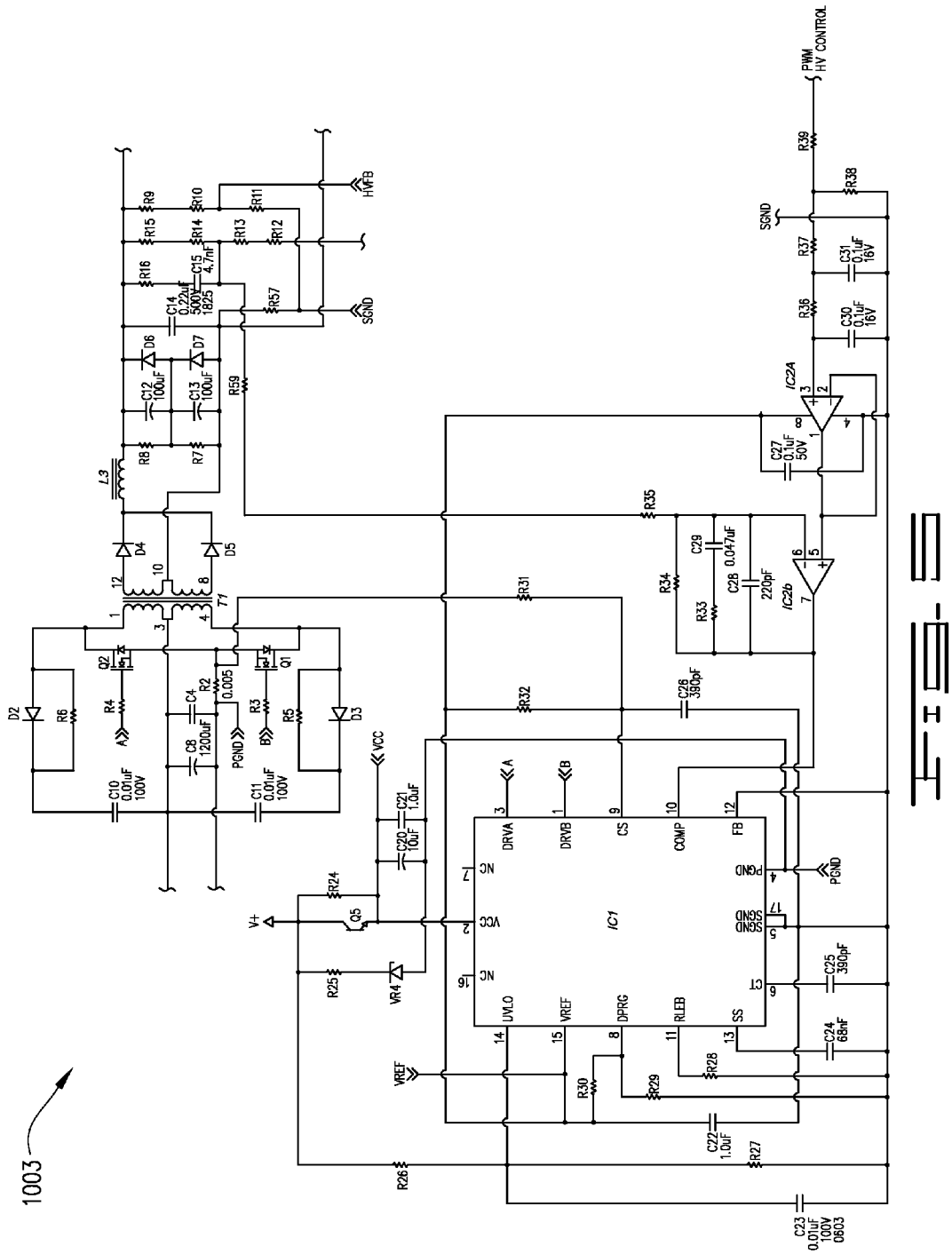
FIG. 15 illustrates a damped oscillation waveform of the spark current provided to the ignition coil as measured by the monitoring circuit when the ignition module is in a continuous spark generation operation mode.

FIG. 15 depicts the third operation mode of ignition module 1000, the continuous spark operation mode having the overlaying control signal from control circuit 1005. As shown in FIG. 15, a new spark cycle (or spark event) occurs when the zero-crossing detector of current monitoring circuit 1006 ceases detecting zero-crossing of the current. A continuous spark can be maintained during the entire cylinder's combustion cycle, but for practical reasons of ignition component stress and diminishing efficacy, the spark current may be terminated after the first half of the cylinder's combustion cycle. In the third operation mode, the +HV rail may be maintained at the highest voltage level provided by ignition module 1000, for example $500V_{DC}$. As described in reference to FIG. 13, each time the "FIRE PWM" control signal is high in FIG. 15, Q3 of switching circuit 1005 is conducting and Q4 conducts with the "FIRE PWM" signal is low.

Ignition coil 1010 may be a known coil in the industry that is provided with the vehicle, an after-market coil, or a custom coil for use in connection with ignition module 1000. Preferably, ignition coils suitable for high performance driving, such as racing, having lower inductance in the primary and secondary windings and lower turn ratios, such as 1:50-120 are suitable. As a result of the smaller primary to secondary turn ratio, lower winding resistances are achievable, less length of wire is required, and the coil does not generate as much heat from winding loss. When the electrical characteristics of ignition coil 1010 are known, those electrical characteristics can be stored within control circuit 1005 or within a custom program to be transferred into control circuit 1005 to provide for optimal operation of ignition module 1000. The electrical characteristics of ignition coil 1010 can assist in the performance of ignition module 1000, for example, by optimizing the energy output due to the extended spark current provided by the damped oscillation. The overall inductance and resistance of ignition coil 1010 affect the ability to have a higher current amplitude, longer duration of the damped oscillation that occurs after the transitions between Q3 and Q4 of switching circuit 1004.

By imposing a high voltage on the primary side of ignition coil 1010, lower primary to secondary step-up ratios can be used. As a result, lower secondary resistances occur with allow for higher spark currents to the spark plug.

Ignition module is configured to provide at least 2 sparks per cylinder per combustion cycle of each cylinder up to 15,000 RPMs and at least 1 spark per cylinder per combustion cycle of each cylinder at and above 15,000 RPMs. Ignition module 1000 may be configured to have a preset number of sparks per RPM range. Table 1 illustrates multi-spark firings versus RPM table contained in the control logic of control circuit 1005 for an 8 cylinder engine. It should be appreciated that the number of sparks per RPM can be modified through software based on user preference and application. In addition, the number of sparks per RPM can vary for different engine sizes (i.e. number of cylinders or strokes) and applications. For example, the timing of the firing of each spark and/or the number of sparks per RPM range may be adjusted in order to: provide more power by more thoroughly burn the air/fuel mixture, provide more fuel mileage, and/or lower emissions.

TABLE 1

| RPM range | Number of Sparks |
|---|---|
| 1-1,249 | 8 |
| 1250-1,874 | 6 |
| 1,875-3,749 | 4 |
| 3,750-14,999 | 2 |
| 15,000-18,000 | 1 |

With reference to FIGS. 3-7, Table 2 provides a list of components in each sub-circuit of the demonstrative embodiment of power circuit 1001 and Table 3 provides a list of example component values. It should be appreciated that the circuitry configuration, components, and component values may vary and are not limited to those disclosed herein.

TABLE 2

| Sub-circuit | Component ID | | | |
|---|---|---|---|---|
| 1002- conditioner circuit | RY-1A | C1 | C7 | V2 |
| | C2 | C8 | C38 | |
| | RY-1B | C3 | C9 | C39 |
| | R1 | C4 | L1 | |
| | R58 | C5 | L2 | |
| | VR1 | C6 | D1 | |
| | VR2 | | | |
| 1003- step-up circuit | IC1 | R13 | R34 | C15 | D3 |
| | IC2A | R14 | R35 | C20 | D4 |
| | IC2B | R15 | R36 | C21 | D5 |
| | R2 | R16 | R37 | C22 | D6 |
| | R3 | R24 | R38 | C23 | D7 |
| | R4 | R25 | R39 | C24 | L3 |
| | R5 | R26 | R57 | C25 | Q1 |
| | R6 | R27 | R59 | C26 | Q2 |
| | R7 | R28 | VR4 | C27 | Q5 |
| | R8 | R29 | C10 | C28 | T1 |
| | R9 | R30 | C11 | C29 | |
| | R10 | R31 | C12 | C30 | |

TABLE 2-continued

| Sub-circuit | Component ID | | | |
|---|---|---|---|---|
| | R11 | R32 | C13 | C31 |
| | R12 | R33 | C14 | D2 |
| 1004- switching circuit | IC3 | R22 | C17 | D10 |
| | R17 | R23 | C18 | D11 |
| | R18 | VR3 | C19 | |
| | R19 | Q3 | C37 | |
| | R20 | Q4 | D8 | |
| | R21 | C16 | D9 | |
| 1006 & 1007- Monitoring Circuit | T2 | R42 | R49 | R56 | C36 |
| | IC4A | R43 | R50 | VR5 | D12 |
| | IC4B | R44 | R51 | VR6 | D13 |
| | IC4C | R45 | R52 | C32 | |
| | IC4D | R46 | R53 | C33 | |
| | R40 | R47 | R54 | C34 | |
| | R41 | R48 | R55 | C35 | |

TABLE 3

| Component ID | Component Value | Component ID | Component Value |
|---|---|---|---|
| R1 | 680 Ω 0.25 W 1% | R29-R30 | 200 KΩ 0.125 W 1% |
| R2 | Ohmite FCSL76R005FERCT 0.005 Ω/3 W current sense resistor | R31 | 1.5 KΩ 0.125 W 1% |
| R3-R4 | 7.5 Ω 0.25 W 1% | R32 | 68.5 KΩ 0.125 W 1% |
| R5-R6 | 22 Ω 1 W 1% | R33 | 1 KΩ 0.125 W 1% |
| R7-R8 | 390 KΩ 0.5 W 1% | R34 | 1 MΩ 0.125 W 1% |
| R9-R10 | 1.1 MΩ 0.25 W 1% | R35 | 20 KΩ 0.125 W 1% |
| R11 | 15 KΩ 0.25 W 1% | R36-R37, R44, R48, R51-R52 | 10 KΩ 0.125 W 1% |
| R12 | 33.2 Ω 0.25 W 1% | R38 | 1.65 KΩ 0.125 W 1% |
| R13 | 2.49 KΩ 0.25 W 1% | R39 | 4.99 KΩ 0.125 W 1% |
| R14-R15 | 523 KΩ 0.5 W 1% 100 PPM | R40 | 240 Ω 0.5 W 1% |
| R16 | 27 KΩ 0.25 W 1% | R41 | 25 Ω 1 W 1% |
| R17 | 4.7 KΩ 0.125 W 1% | R42 | 10 KΩ 0.25 W 1% |
| R18 | 1.0 Ω 0.25 W 1% | R43 | 20 KΩ 0.25 W 1% |
| R19 | 2.2 Ω 0.25 W 1% | R45 | 2.2 MΩ 0.125 W 1% |
| R20 | 30 Ω 0.25 W 1% | R46 | 20 Ω 0.125 W 1% |
| R21 | 10 Ω 0.25 W 1% | R47 | 100 KΩ 0.125 W 1% |
| R22 | 1 MΩ 0.5 W 1% | R49, R55 | 4.7 MΩ 0.125 W 1% |
| R23 | 20 Ω 0.25 W 1% | R50, R56 | 2 KΩ 0.125 W 1% |
| R24-R25 | 470 Ω 0.25 W 1% | R57 | 0 Ω 0.125 W 1% |
| R26 | 68.1 KΩ 0.125 W 1% | R58 | 470 Ω 0.5 W 1% |
| R27, R53-R54 | 100 KΩ 0.125 W 1% | R59 | 0 Ω 0.25 W 5% |
| R28 | 34.8 KΩ 0.125 W 1% | D1-D3; D6-D13 | 1 A/600 V ultrafast rectifiers, On-Semi MURHS160T3G |
| C1-C4 | 4.7 uF/50 V monolithic ceramic; AVX12065C475KAT2A | D4-D5 | 8 A/1000 V ultrafast rectifiers, ST Semicon STTH810G |
| C5-C8 | 1200 uF/35 V AE Radial + 125 C.; Chemicon EGPA350ELL122MU25S | VR1 | 22-26 V/3 KW TVS diode; Bourns SML J22A; SML J24A, SML J26A |
| C9 | 100uF/35 V AE SMD + 105 C.; Chemicon EMVE350ADA101MF80G | VR2 | 18-20 V/1.5 KW TVS diode; Bourns SMCJ18A; SMCJ20A |
| C10-C11, C23 | 10 nF/100 V monolithic ceramic capacitor; AVX06031C103MAT2A | VR3 | 20 V/0.5 W Zener diode; On-Semi MMSZ5250BT1G |
| C12-C13 | 100 uF/350 V AE Radial + 105 C.; Chemicon EKXG351ELL101MM25S | VR4 | 9.1 V/0.5 W Zener diode; On-Semi MMSZ5239BT1G |
| C14, C37 | 0.22 uF/500 V monolithic ceramic capacitor; AVX18257C224MAT1A | VR5 | 0.5 A/5 V voltage regulator; Texas Instruments UA78M05CDCYR |
| C15 | 4.7 nF/630 V 5% PEN Film Capacitor; AVX CB037K0472 | VR6 | 10 V/0.5 W Zener diode; On-Semi MMSZ5240BT1G |
| C16, C18, C20, C33 | 10 uF/25 V tantalum capacitor; AVX TAJC106M025RNJ | Q1-Q2 | 75 A/100 V MOSFET; International Rectifier AUIRFS4310 |
| C17, C21-C22, C38 | 1.0 uF/50 V monolithic ceramic capacitor; AVX12105C105KAT2A | Q3-Q4 | 24 A/600 V IGBT; International Rectifier AUIRGB4062D1 |
| C19 | 1.5 uF/630 V polypropylene film capacitor; CDE BPM6W1P5K-F | Q5 | On-Semi MMBT3904LT1 NPN transistor |

TABLE 3-continued

| Component ID | Component Value | Component ID | Component Value |
|---|---|---|---|
| C24 | 68 nF/16 V 5% PPS film capacitor; Panasonic ECH-U1C683JB5 | IC1 | 1 PWM controller; Linear Technology LTC3721EUF- |
| C25-C26, C35 | 390 pF/16 V 2% PPS film capacitor; Panasonic ECH-U1C391GX5 | IC2 | dual CMOS op-amp; Microchip MCP602-I/SN |
| C27, C32, C34 | 0.1 uF/50 V monolithic ceramic capacitor; AVX0805C104KAT2A | IC3 | IGBT half-bridge driver; International Rectifier AUIRS2302S |
| C28, C36 | 10 nF/16 V 5% PPS film capacitor; Panasonic ECH-U1C103JX5 | IC4 | Texas Instruments LM339AD quad comparator |
| C29 | 18 nF/16 V 5% PPS film capacitor; Panasonic ECH-U1C183JX5 | T1 | Imag X7501 switching transformer w/ETD29 coil former |
| C30-C31 | 0.1 uF/16 V 5% PPS film capacitor; Panasonic ECH-U1C104JB5 | T2 | Triad CST306-1T current sense transformer |
| C39 | 47 uF/35 V aluminum electrolytic capacitor | L1 | Imag X7503 input filter inductor |
| V2 | Low Dropout Regulator - LM2940CT-15 | L2 | 18 uH/15 A SMD filter inductor, Vishay IFSC1008ABER100M01 |
| RY1 | SPDT 12 V relay, TE Connectivity (Tyco) 1461069-5 | L3 | Imag X7502 output filter inductor |

The following paragraphs discuss the external inputs 1008a to control circuit 1005, the outputs of control circuit 1005, and other software selectable features of control circuit 1005.

With reference to FIG. 2B, all the inputs 1008a to control circuit 1005 are enabled when pulled up to battery voltage with an external user installed switch or sensor and all inputs 1008a are protected from voltage transients, for example via buffers or other conditioner circuits known in the art.

The Hall Effect device (HED)/Points input provides information of engine RPM and timing. The HED/Points input is provided to control circuit 1005 from mechanical timing points or the output of both factory and aftermarket electronic ignition systems or engine management systems. Control circuit 1005 may be configured, via software, to receive RPM input from a Hall Effect device in use on both factory and aftermarket ignition systems including a direct crankshaft timing sensor. Control circuit 1005 may be configured to support both $+5V_{DC}$ and $+12V_{DC}$ Hall Effect devices. As a result, ignition module 1000, via control circuit 1005 may control the timing advance (spark occurring sooner as the engine speed increases) versus RPM for applications where no timing advance schemes exist, such as a with a crankshaft triggered ignition.

Another input to control circuit 1005 may include inputs from an inductive pick-up coil, such as a Crank Trigger Input and a Propeller Shaft Input. The Crank Trigger Input is provided from, for example, an aftermarket inductive coil crankshaft RPM/timing sensor. The input from this sensor resembles a sine wave. This input provides information relating to the crankshaft position. Control circuit 1005 can compensate for the timing lag on various inductive crank trigger systems through software settings.

The Propeller Shaft Input is a sensor input to control circuit 1005 such that control circuit 1005 can manage wheel-spin of a vehicle. The Propeller Shaft Input is another inductive RPM sensor that provides wheel-spin data to control circuit 1005 to provide a means of traction control by directly measuring the rotational speed of a vehicle's propeller shaft (driveshaft), for example measurement of the angular acceleration rate to determine whether excessive wheel-spin exists. Excessive wheel-spin is indicative of a loss of traction. Upon detection of excessive wheel-spin, based on user-selected operating thresholds, control circuit 1005 can either, depending of the severity of the wheel spin, retard ignition timing and/or start deleting cylinders in order to regain traction by decreasing the engine's power output. This input may be provided by a sensor similar to the circuitry of the Crank Trigger sensor.

RPM limiters may also be used by control circuit 1005. FIG. 2B shows two example RPM limiter input types, a Burn-Out and Two-Step. The Burn-Out RPM Limiter input, when enable by a user, via software, allows for a maximum RPM during a "burn-out" to heat up the tires in drag racing. Use of this input lowers the stress on the engine by reducing the RPM limit during a burn-out versus driving conditions. This limit may be software adjustable from about 0 RPMs to about 8,000 RPMs.

The second example of an RPM limiter is the Two-Step RPM limiter input. This input may be suitable for use at a drag racing starting line in order to achieve a consistent launch. This limit may be software adjustable from about 0 RPMs to about 8,000 RPMs. This limit may be canceled by a switch, such as a line lock, transbrake, or clutch when the vehicle leaves the starting line. After cancellation of the limit, the RPM limit may default to the pre-programmed maximum RPM limit.

The input labeled "Spark Disable Input" is a type of RPM limited configured to work with an aftermarket engine management unit that can directly force RPM limiting. Several timing retards may also be used as inputs for control circuit 1005. The High Gear retard input reduces the maximum ignition timing advance when the vehicle's transmission is in a high gear. Through software selection, this input can provide up to 30 degrees of timing retard. This input can prevent damaging engine detonation due to the higher engine load and combustion chamber temperatures when in high gear.

In an attempt to mitigate wheel-spin upon take-off in drag racing, the "hole shot" retard input retards the ignition timing to reduce engine power during vehicle "launch" or a "hole shot". This input is configured to provide up to 30 degrees of timing retard and the timing retard functionality for a predetermined time duration provided through user-selected options via software in control circuit 1005.

For a vehicle using a Nitrous Oxide System (NOS), it is necessary to retard the ignition timing advance by an amount of time, for example, such as 2-4 degrees per 100 horsepower added by the NOS, to prevent detonation due to the higher burn rate and temperature of nitrous oxide. As shown in FIG. 2B, there are four NOS inputs which provide for increasing the nitrous oxide injection volume with additional timing retard for each stage. All four NOS stages can provide up to 30 degrees of timing retard via software selection.

Also included as an input to control circuit 1005 may be a MAP sensor signal from a Manifold Absolute Pressure (MAP) sensor. This input may be compatible with up to a 5 BAR and provides control circuit 1005 a way to sense engine load by way of manifold vacuum value and supercharger boost value to both manage spark energy levels, by modulating the energy level output of ignition module 1000 and/or manage ignition timing with boost pressure present.

The "data trigger input" provides a user of ignition module 1000 a way to record and review various software selectable parameters and their operation during a specified period of time in order to monitor performance and/or identify and diagnose problems in the engine. Such selectable parameters include RPM vs. time; MAP vs. RPM; and/or timing vs. RPM. The user is able to "replay" or review the recorded parameters using the communication I/O ports discussed above, for example serial RS-232 communication ports, of control circuit 1005. A user may trigger this input by a WOT (wide open throttle) switch, transbrake switch, or a clutch pedal switch.

The external outputs 1009 of control circuit 1005 are all active low and may be overcurrent protected to about one ampere (A). The auxiliary output may be a software assigned output (by the user) that can be used to alert the user than an RPM limit has been reached, or timing is being retarded, or a boost level has been reached. The tachometer signal output provides a signal representative of the engine's RPM. This output can also indicate an optional user software selected parameter upon power-up and/or configuration of control circuit 1005. It should be appreciated that circuitry, not depicted may also be included, for example, circuitry that buffers and conditions the output signals 1009 from ignition module 1000 to protect its components as well as the integrity of the communicated signal.

The RPM-1 and RPM-2 outputs are configured to become active when a software selected RPM value has been reached or exceeded, preferably the set RPM value for RPM-1 and RPM-2 are different. This output can be used as a transmission shift indicator, for example, connected to an external device to provide a visual indication to the vehicle operator that the next gear should be selected. This output is adjustable through software up to the maximum RPM limiter's setting.

The RPM Window-1 and RPM Window-2 outputs are two independent outputs that are active when the engine RPM is between an upper and lower user-selected "window" value. The upper limit of each window may be selected up to the maximum RPM limiter's setting. Users may typically use these outputs to activate and deactivate NOS for safer operation.

Ignition module 1000 may also provide two visual indications of proper operation or fault of ignition module 1000. For example, a red LED (light emitting diode) may provide a visual indication that that module 1000 is powered on, and may blink to indicate if control circuit 1005 detects a fault. A flashing green LED may indicate a good RPM trigger exists. As shown in FIG. 2B, control circuit 1005 is operably connected to the visual indicia LEDs.

Control circuit 1005 may also include software only selected parameters. As previously discussed, a user of ignition module 1000 may have a custom software program for communicating with ignition module 1000. Some parameters may only be accessed and modified by the user through the communication link between ignition module 1000 and an external computing device.

For example, the maximum RPM limit may be set as high as 18,000 RPM for an 8-cylinder engine whereupon soft-rev limiting takes effect. It should be appreciated that the maximum RPM limit may differ for various sized engines. This software selected limit is configured to persist until the RPM drops an adjustable 100 to 500 RPM below the selected limit.

As previously discussed, ignition module 1000 is configured to delete and the rotate firing of cylinders in order to reduce the power output of the engine such that the engine cannot exceed past a set RPM limit. When this feature is employed, control circuit 1005 begins deleting cylinder pairs just before the actual set limit is met in order to minimize any RPM "overshoot". During the limiting event, no single pair of cylinders is continuously deleted (meaning that a cylinder is fired at least one per two consecutive combustion cycles of that cylinder). The deleted cylinder pairs are rotated so as not to allow excessive fuel buildup in the non-firing cylinders. This rotation also keeps all cylinders at an elevated temperature, which provides for easier re-fire without any misfires (as may be experienced with a cold cylinder).

Another software selectable feature of ignition module 1000 includes a user programmable timing map that can be enabled on vehicles where there no other timing advance scheme exists, such as when using a crankshaft timing sensor. This map provides the user with a way to set boost timing retard. The user programmable timing map may be a 16 by 16 cell matrix having user selectable RPM on the X-axis and selectable load breakpoints on the Y-axis. The load is sensed by the MAP sensor.

Another software-selectable parameter includes an engine start timing retard that allows the user to select a reduced timing, adjustable from 0 to 30 degrees, for starting high compression engines. This may be preferable for heat soaked engines as it reduces the stress on the cranking system components.

The above discussion relates to an ignition system having a distributor. The described ignition module is also suitable for use in a distributorless ignition system (DIS). As known to those skilled in the art, a DIS has an ignition coil for every cylinder. For ignition module 1000 used in a DIS system, ignition module 1000 is configured to cooperate with the factory and/or aftermarket engine management unit in the vehicle. The engine management unit in the vehicle manages and controls the firing sequence of the ignition coils and will select which coil(s) ignition module 1000 is to provide its high voltage output. The coil selection is received from the engine management unit and ignition module 1000 will pass the high voltage output to the identified coil(s).

Other embodiments of the described ignition module, ignition system, and method will be apparent to one skilled in the art. As such, the foregoing description merely enables and describes the general uses and methods of the described module and method. Accordingly, the following claims define the true scope of the present disclosure.

What is claimed is:

1. An ignition module configured to energize an ignition coil and cause a generation of one or more sparks in a spark plug during a single combustion cycle of a cylinder in an internal combustion engine, said spark plug operably connected to said ignition coil, the ignition module comprising:
   a control circuit; and
   a power circuit electrically coupled to said control circuit;
   wherein said control circuit is configured to receive one or more inputs from external devices or said power circuit, said one or more inputs indicate one or more engine operating parameters, and wherein said control circuit is configured to provide one or more control signals to said power circuit, responsive in part, to said one or more received inputs from said external devices or said power circuit;
   wherein said power circuit is configured to draw DC electrical energy from an external power source having a first energy level and output AC electrical energy having a second energy level, based in part on one or more control signals received from said control circuit, said second energy level greater than said first energy level, wherein said power circuit is configured to communicate said AC electrical energy to a primary side of the ignition coil, and said ignition coil supplies through a secondary side of said ignition coil a third energy level to said spark plug to generate said one or more sparks in said spark plug during a single combustion cycle of a cylinder in an internal combustion engine; and
   wherein said power circuit includes a monitoring circuit configured to be operably coupled to said primary side of the ignition coil and configured to monitor a current of said AC electrical energy having said second energy level and communicate a status of said monitored current to said control circuit, wherein said control circuit is configured to detect a misfire of said spark plug through monitoring current of said primary side of said ignition coil, and upon detection of said misfire said control circuit is configured to cause an additional spark in said spark plug to occur prior to completion of said single combustion cycle of the cylinder.

2. The ignition module of claim 1, wherein said module is configured to operate in one or more operation modes.

3. The ignition module of claim 1, wherein when said ignition module is in a first operation mode, said first operation mode provides a preset number of sparks per combustion cycle based on an RPM input from said external device, and said second energy level of said AC electrical energy transferred to said primary side is modulated by said control circuit based on said one or more inputs from said external devices.

4. The ignition module of claim 1, wherein when said module is in a second operation mode, said second operation mode provides a preset number of sparks per combustion cycle independent of said one or more inputs from said external devices.

5. The ignition module of claim 1, wherein when said module is in a third operation mode, said third operation mode continually provides a new spark cycle upon detecting a cessation of a prior spark cycle.

6. The ignition module of claim 1, wherein said power circuit includes a conditioner circuit, a step-up circuit, a switching circuit, and said monitoring circuit operably coupled and cooperating together.

7. The ignition module of claim 1, wherein said power circuit includes:
   a conditioner circuit operably connected to said external power source, said conditioner circuit configured to convert said drawn DC electrical energy from said external power source into a clean DC electrical energy having said first energy level thereby providing protection of said power circuit and said control circuit.

8. The ignition module of claim 1, wherein said power circuit includes:
   a step-up circuit configured to convert said drawn DC electrical energy having said first energy level into a DC electrical energy having said second energy level.

9. The ignition module of claim 7, wherein said power circuit includes:
   a step-up circuit configured to convert said clean DC electrical energy having said first energy level from said conditioner circuit into a clean DC electrical energy having said second energy level.

10. The ignition module of claim 1, wherein said power circuit includes:
    a switching circuit configured to receive DC electrical energy having said second energy level into said AC electrical energy having said second energy level, said switching circuit provides said AC electrical energy having said second energy level to said primary side of said ignition coil.

11. The ignition module of claim 8, wherein said power circuit includes:
    a switching circuit configured to convert said DC electrical energy having said second energy level into said AC electrical energy having said second energy level, said switching circuit providing said AC electrical energy having said second energy level to said primary side of said ignition coil.

12. The ignition module of claim 9, wherein said power circuit includes:
    a switching circuit configured convert said clean DC electrical energy having said second energy level into said AC electrical energy having said second energy level, said switching circuit providing said AC electrical energy having said second energy level to said primary side of said ignition coil.

13. The ignition module of claim 1 wherein said first energy level is about 8.0 volts to about 18.0 volts, and all values therebetween; and said second energy level is about 250 volts to about 500 volts, and all values therebetween; and said third energy level is about 40,000 volts to about 60,000 volts.

14. The ignition module of claim 10, wherein said switching circuit includes two insulated gate bipolar transistors (IGBTs) in a half-bridge arrangement.

15. The ignition module of claim 1, wherein said control circuit is configured to manage a spark firing order for each cylinder, and wherein said control circuit is configured to delete and rotate a cylinder pair before exceeding a predetermined RPM threshold such that the spark plug of each cylinder is fired at least once per every two combustion cycles of the cylinder.

16. The ignition module of claim 1, wherein said ignition module is configured to cause at least 8 sparks to be generated in said spark plug when said internal combustion engine is between 1-1,249 RPMs.

17. The ignition module of claim 1, wherein said ignition module is configured to cause at least 6 sparks to be generated in said spark plug when said internal combustion engine is between 1,250-1,874 RPMs.

18. The ignition module of claim 1, wherein said ignition module is configured to cause at least 4 sparks to be generated in said spark plug when said internal combustion engine is between 1,875-3,749 RPMs.

19. The ignition module of claim 1, wherein said ignition module is configured to cause at least 2 sparks to be generated in said spark plug when said internal combustion engine is between 3,750-14,999 RPMs.

20. The ignition module of claim 1, wherein said ignition module is configured to cause at least 1 spark to be generated in said spark plug when said internal combustion engine is between 15,000-18,000 RPMs.

21. The ignition module of claim 2, wherein when said ignition module is in a first operation mode, said first operation mode provides a preset number of sparks per combustion cycle based on an RPM input from said external device, and said second energy level of said AC electrical energy transferred to said primary side is modulated by said control circuit based on said one or more inputs from said external devices.

22. The ignition module of claim 2, wherein when said module is in a second operation mode, said second operation mode provides a preset number of sparks per combustion cycle independent of said one or more inputs from said external devices.

23. The ignition module of claim 2, wherein when said module is in a third operation mode, said third operation mode continually provides a new spark cycle upon detecting a cessation of a prior spark cycle.

24. The ignition module of claim 2, wherein said first energy level is about 8.0 volts to about 18.0 volts, and all values therebetween; and said second energy level is about 250 volts to about 500 volts, and all values therebetween; and said third energy level is about 40,000 volts to about 60,000 volts.

25. The ignition module of claim 2, wherein said ignition module is configured to cause at least 8 sparks to be generated in said spark plug when said internal combustion engine is between 1-1,249 RPMs.

26. The ignition module of claim 2, wherein said ignition module is configured to cause at least 6 sparks to be generated in said spark plug when said internal combustion engine is between 1,250-1,874 RPMs.

27. The ignition module of claim 2, wherein said ignition module is configured to cause at least 4 sparks to be generated in said spark plug when said internal combustion engine is between 1,875-3,749 RPMs.

28. The ignition module of claim 2, wherein said ignition module is configured to cause at least 2 sparks to be generated in said spark plug when said internal combustion engine is between 3,750-14,999 RPMs.

29. The ignition module of claim 2, wherein said ignition module is configured to cause at least 1 spark to be generated in said spark plug when said internal combustion engine is between 15,000-18,000 RPMs.

30. The ignition module of claim 11, wherein said switching circuit includes two insulated gate bipolar transistors (IGBTs) in a half-bridge arrangement.

31. The ignition module of claim 15, wherein said ignition module is configured to cause at least 8 sparks to be generated in said spark plug when said internal combustion engine is between 1-1,249 RPMs.

32. The ignition module of claim 15, wherein said ignition module is configured to cause at least 6 sparks to be generated in said spark plug when said internal combustion engine is between 1,250-1,874 RPMs.

33. The ignition module of claim 15, wherein said ignition module is configured to cause at least 4 sparks to be generated in said spark plug when said internal combustion engine is between 1,875-3,749 RPMs.

34. The ignition module of claim 15, wherein said ignition module is configured to cause at least 2 sparks to be generated in said spark plug when said internal combustion engine is between 3,750-14,999 RPMs.

35. The ignition module of claim 15, wherein said ignition module is configured to cause at least 1 spark to be generated in said spark plug when said internal combustion engine is between 15,000-18,000 RPMs.

36. A method of ignition spark generation and management of a cylinder in an internal combustion engine during a combustion cycle, the method comprising:
providing, from an ignition module, electrical energy having a first energy level to a primary winding of an ignition coil;
transforming said electrical energy from a first energy level to a second energy level through a secondary winding of said ignition coil, said second energy level higher than said first level;
transmitting said second energy level to a spark plug electrically coupled to said secondary winding;
generating a spark across said spark plug;
detecting, by said ignition module, a misfire of said spark plug through monitoring current of said primary winding of said ignition coil, and upon detection of said misfire, said ignition module causing said ignition coil to generate an additional spark across said spark plug prior to the end of said combustion cycle.

37. The method of claim 36 further including
conditioning and converting electrical energy from a vehicle having a base energy level to said first energy level, wherein said first energy level is greater than said base energy level, and wherein said conditioning and converting step includes cleaning said electrical energy from said vehicle to reduce one or more of electromagnetic interference, noise, and spikes contained in said electrical energy, and wherein said electrical energy having said base energy level is DC electrical energy and said electrical energy having said second energy level is AC electrical energy.

38. The method of claim 36, wherein said ignition module receives one or more inputs from one or more sensors indicating operation parameters of said engine, and wherein said ignition module modulates said provided electrical energy having said first energy level between 250 volts to 500 volts in response in part to said received one or more inputs.

39. The method of claim 36, wherein said ignition module includes
a control circuit; and
a power circuit electrically coupled to said control circuit;
wherein said control circuit is configured to receive one or more inputs from external devices or said power circuit, said one or more inputs indicate one or more engine operating parameters, and wherein said control circuit is configured to provide one or more control signals to said power circuit, responsive in part, to said one or more received inputs from said external devices or said power circuit;
wherein said power circuit is configured to draw DC electrical energy from an external power source having a base energy level and output AC electrical energy having said first energy level, based in part on one or more control signals received from said control circuit, said first energy level greater than said base energy level, wherein said power circuit is configured to communicate said AC electrical energy to said primary winding of the ignition coil.

40. A method comprising:
conditioning and converting electrical energy received from a external power source having a base energy level to a first energy level;
providing said first energy level to a primary winding of an ignition coil to energize said ignition coil to generate a spark in a spark plug electrically coupled to said ignition coil;
detecting a misfire of said spark plug by monitoring a current of said primary winding of said ignition coil, and upon detection of said misfire, causing said ignition coil to generate an additional spark across said spark plug prior to the end of a single combustion cycle for a given cylinder thereby causing one or more sparks to be generated within said given cylinder during said single combustion cycle.

41. The method of claim 40, wherein said first energy level is greater than said base energy level, and wherein said conditioning and converting step includes cleaning said electrical energy from said vehicle to reduce one or more of electromagnetic interference, noise, and spikes contained in said electrical energy, and wherein said electrical energy having said base energy level is DC electrical energy and said electrical energy provided to said primary winding of said ignition coil is AC electrical energy.

42. The method of claim 40, wherein said first energy level is between about 250 volts to about 500 volts.

* * * * *